(12) United States Patent
Woods et al.

(10) Patent No.: US 10,708,297 B2
(45) Date of Patent: Jul. 7, 2020

(54) SECURITY SYSTEM FOR DETECTION AND MITIGATION OF MALICIOUS COMMUNICATIONS

(71) Applicant: Ecrime Management Strategies, Inc., Charleston, SC (US)

(72) Inventors: Matt Woods, Charleston, SC (US); Mark Blaise DeCotes, Charleston, SC (US); Bryan Peterson, Charleston, SC (US); Joseph Opacki, Mount Pleasant, SC (US)

(73) Assignee: ECRIME MANAGEMENT STRATEGIES, INC., Charleston, SC (US)

( * ) Notice: Subject to any disclaimer, the term of this patent is extended or adjusted under 35 U.S.C. 154(b) by 260 days.

(21) Appl. No.: 15/858,483

(22) Filed: Dec. 29, 2017

(65) Prior Publication Data
US 2019/0068616 A1    Feb. 28, 2019

Related U.S. Application Data

(60) Provisional application No. 62/550,372, filed on Aug. 25, 2017.

(51) Int. Cl.
*H04L 29/06* (2006.01)
*G06F 21/53* (2013.01)
(Continued)

(52) U.S. Cl.
CPC .......... *H04L 63/145* (2013.01); *G06F 16/258* (2019.01); *G06F 16/9566* (2019.01);
(Continued)

(58) Field of Classification Search
CPC combination set(s) only.
See application file for complete search history.

(56) References Cited

U.S. PATENT DOCUMENTS

| 7,225,466 B2 | 5/2007 | Judge |
| 7,310,660 B1 | 12/2007 | White et al. |

(Continued)

OTHER PUBLICATIONS

Phishlabs; Spear Phishing Protection; "T2 Employee Defense Training"; captured by the Wayback Machine on Mar. 24, 2016; retrieved from the internet on Aug. 18, 2017; 3 pages.

(Continued)

*Primary Examiner* — Malcolm Cribbs
(74) *Attorney, Agent, or Firm* — Moore & Van Allen PLLC; Peter B. Stewart

(57) ABSTRACT

Embodiments of the present invention relate to, in general, detecting and mitigating malicious communications. Typically, a system of the present invention is configured to deliver indicators of compromise in response to identifying and isolating malicious communication. Moreover, the system is configured to analyze an electronic communication to determine if it is malicious or if it has a malicious payload. In some embodiments, the system is configured to determine an indicator of compromise for the electronic communication determined to be malicious, and transmit this indicator of compromise to the first networked device. In some embodiments, the system transmits a threat trigger signal to a third party provider. The threat trigger signal is configured to allow an application or system provided by the third party provider to block a threat caused by the electronic communication. In some embodiments, the system provides training to help users better identify and report threats.

31 Claims, 7 Drawing Sheets

(51) Int. Cl.
*G06F 16/25* (2019.01)
*G06F 16/955* (2019.01)
*H04L 12/58* (2006.01)
*H04L 29/08* (2006.01)

(52) U.S. Cl.
CPC .............. *G06F 21/53* (2013.01); *H04L 51/08* (2013.01); *H04L 51/12* (2013.01); *H04L 63/1416* (2013.01); *H04L 63/20* (2013.01); *G06F 2221/034* (2013.01); *H04L 51/22* (2013.01); *H04L 63/0227* (2013.01); *H04L 67/02* (2013.01)

(56) References Cited

U.S. PATENT DOCUMENTS

| | | | |
|---|---|---|---|
| 7,500,265 B2 | 3/2009 | Encinas et al. | |
| 7,587,761 B2 | 9/2009 | Duffield et al. | |
| 7,634,810 B2 | 12/2009 | Goodman et al. | |
| 7,665,131 B2 | 2/2010 | Goodman et al. | |
| 7,716,297 B1 | 5/2010 | Wittel et al. | |
| 7,774,413 B2 | 8/2010 | Costea et al. | |
| 7,831,834 B2 | 11/2010 | Hickman et al. | |
| 7,856,477 B2 | 12/2010 | Libbey et al. | |
| 7,873,993 B2 | 1/2011 | King | |
| 7,890,590 B1 | 2/2011 | Cooley | |
| 7,899,866 B1 | 3/2011 | Buckingham et al. | |
| 7,904,958 B2 | 3/2011 | Lee | |
| 7,930,353 B2 | 4/2011 | Chickering et al. | |
| 7,937,468 B2 | 5/2011 | Libbey et al. | |
| 7,945,684 B2 | 5/2011 | Bates et al. | |
| 7,949,718 B2 | 5/2011 | Daniell et al. | |
| 8,024,803 B1 | 9/2011 | Cooley et al. | |
| 8,028,335 B2 | 9/2011 | Udezue et al. | |
| 8,131,805 B2 | 3/2012 | Yang | |
| 8,140,660 B1 | 3/2012 | Wells et al. | |
| 8,141,150 B1 | 3/2012 | Krishnamurthy | |
| 8,191,138 B1 | 5/2012 | Emigh et al. | |
| 8,195,750 B1 | 6/2012 | Bakhmutov | |
| 8,214,898 B2 | 7/2012 | Liu | |
| 8,307,418 B2* | 11/2012 | Devdhar | H04L 63/0236 370/235 |
| 8,359,649 B1 | 1/2013 | Sobel et al. | |
| 8,370,930 B2 | 2/2013 | Mills et al. | |
| 8,484,733 B2 | 7/2013 | Pirzada et al. | |
| 8,490,185 B2 | 7/2013 | Gillum et al. | |
| 8,495,737 B2 | 7/2013 | Sinha et al. | |
| 8,555,379 B1 | 10/2013 | Whitehouse et al. | |
| 8,555,381 B2 | 10/2013 | McLaughlin et al. | |
| 8,566,938 B1 | 10/2013 | Prakash et al. | |
| 8,566,947 B1 | 10/2013 | Sankruthi | |
| 8,601,577 B1 | 12/2013 | Ashley | |
| 8,606,866 B2 | 12/2013 | Rybalko | |
| 8,612,523 B1 | 12/2013 | Oliver et al. | |
| 8,615,807 B1 | 12/2013 | Higbee et al. | |
| 8,621,614 B2 | 12/2013 | Vaithilingam et al. | |
| 8,621,623 B1 | 12/2013 | Yuksel | |
| 8,626,861 B1 | 1/2014 | Duan et al. | |
| 8,644,461 B2 | 2/2014 | Ramanathan et al. | |
| 8,671,447 B2 | 3/2014 | Eikenberry et al. | |
| 8,707,426 B1 | 4/2014 | Ramzan et al. | |
| 8,745,731 B2 | 6/2014 | Achan et al. | |
| 8,752,169 B2 | 6/2014 | Long et al. | |
| 8,763,113 B2 | 6/2014 | Thomas et al. | |
| 8,782,781 B2 | 7/2014 | Dulitz et al. | |
| 8,825,769 B2 | 9/2014 | Zheleva | |
| 8,839,369 B1 | 9/2014 | Dai et al. | |
| 8,839,418 B2 | 9/2014 | Hulten et al. | |
| 8,856,525 B2 | 10/2014 | Kaplan | |
| 8,856,937 B1 | 10/2014 | West et al. | |
| 8,910,281 B1 | 12/2014 | Aharoni et al. | |
| 8,910,287 B1 | 12/2014 | Belani et al. | |
| 8,935,783 B2 | 1/2015 | Toma et al. | |
| 8,943,591 B2 | 1/2015 | Wood | |
| 8,966,620 B2 | 2/2015 | Hines et al. | |
| 8,966,637 B2 | 2/2015 | Belani et al. | |
| 9,015,846 B2 | 4/2015 | Watters et al. | |
| 9,027,128 B1 | 5/2015 | Oliver et al. | |
| 9,224,117 B2 | 12/2015 | Chapman | |
| 9,356,948 B2 | 5/2016 | Higbee et al. | |
| 9,635,052 B2 | 4/2017 | Hadnagy | |
| 9,699,207 B2 | 7/2017 | Chapman | |
| 2005/0022014 A1* | 1/2005 | Shipman | G06F 21/564 726/4 |
| 2005/0114452 A1* | 5/2005 | Prakash | H04L 51/12 709/206 |
| 2005/0198518 A1 | 9/2005 | Kogan et al. | |
| 2005/0262559 A1 | 11/2005 | Huddleston | |
| 2006/0021029 A1* | 1/2006 | Brickell | G06F 21/51 726/22 |
| 2006/0095966 A1 | 5/2006 | Park | |
| 2006/0174001 A1* | 8/2006 | Zhu | H04L 63/1416 709/225 |
| 2007/0143411 A1 | 6/2007 | Costea et al. | |
| 2007/0150951 A1 | 6/2007 | Aaron et al. | |
| 2007/0220602 A1 | 9/2007 | Ricks et al. | |
| 2008/0047007 A1 | 2/2008 | Satkunanathan et al. | |
| 2008/0086773 A1* | 4/2008 | Tuvell | G06F 21/55 726/23 |
| 2008/0127340 A1 | 5/2008 | Lee | |
| 2008/0205774 A1 | 8/2008 | Brinker et al. | |
| 2009/0055484 A1 | 2/2009 | Vuong et al. | |
| 2009/0064323 A1 | 3/2009 | Lin | |
| 2009/0158429 A1 | 6/2009 | Alstyne et al. | |
| 2009/0187988 A1 | 7/2009 | Hulten et al. | |
| 2009/0265763 A1 | 10/2009 | Davies et al. | |
| 2010/0017487 A1 | 1/2010 | Patinkin | |
| 2010/0095377 A1 | 4/2010 | Krywaniuk | |
| 2010/0229236 A1 | 9/2010 | Rybak | |
| 2010/0281535 A1 | 11/2010 | Perry, Jr. et al. | |
| 2010/0312621 A1 | 12/2010 | Abdulhayoglu | |
| 2011/0167474 A1 | 7/2011 | Sinha et al. | |
| 2011/0191847 A1 | 8/2011 | Davis et al. | |
| 2011/0197275 A1 | 8/2011 | Chasin et al. | |
| 2011/0295959 A1 | 12/2011 | Martin et al. | |
| 2012/0258437 A1* | 10/2012 | Sadeh-Koniecpol | G09B 5/00 434/362 |
| 2013/0104229 A1 | 4/2013 | Brennan, III | |
| 2013/0232576 A1* | 9/2013 | Karnikis | G06F 21/56 726/24 |
| 2014/0199664 A1* | 7/2014 | Sadeh-Koniecpol | G09B 5/00 434/118 |
| 2015/0007312 A1* | 1/2015 | Pidathala | H04L 63/145 726/22 |
| 2015/0020193 A1 | 1/2015 | Yost et al. | |
| 2015/0026804 A1 | 1/2015 | Wood | |
| 2015/0040218 A1 | 2/2015 | Alperovitch et al. | |
| 2015/0067833 A1 | 3/2015 | Verma et al. | |
| 2015/0229664 A1* | 8/2015 | Hawthorn | H04L 63/1433 726/25 |
| 2015/0264064 A1 | 9/2015 | Gerard | |
| 2015/0264084 A1 | 9/2015 | Kashyap et al. | |
| 2015/0288714 A1 | 10/2015 | Emigh et al. | |
| 2016/0099826 A1* | 4/2016 | Logue | G06F 16/258 709/223 |
| 2016/0182561 A1* | 6/2016 | Reynolds, II | H04L 41/0686 726/1 |
| 2016/0301705 A1 | 10/2016 | Higbee et al. | |
| 2017/0026387 A1* | 1/2017 | Vissamsetty | H04L 63/1408 |
| 2017/0026388 A1* | 1/2017 | Gatti | H04L 63/1408 |
| 2017/0223046 A1* | 8/2017 | Singh | H04L 43/062 |
| 2018/0351781 A1* | 12/2018 | Movsisyan | H04L 67/025 |
| 2019/0089722 A1* | 3/2019 | Ciocarlie | H04L 67/22 |

OTHER PUBLICATIONS

Phishlabs; Spear Phishing Protection; "Stop Phishing Attacks . . . "; captured by the Wayback Machine on Apr. 4, 2016; retrieved from the Internet on Aug. 18, 2017; 5 pages.

* cited by examiner

SECURITY SYSTEM FOR DETECTION AND MITIGATION OF MALICIOUS COMMUNICATIONS

CROSS-REFERENCE TO PRIORITY APPLICATION

This application claims the benefit of U.S. Provisional Patent Application Ser. No. 62/550,372 entitled "Security System for Detection and Mitigation of Malicious Communications" (filed Aug. 25, 2017), which is hereby incorporated by reference in its entirety.

BACKGROUND

Computer terminals are widely used by individuals to perform a variety of activities and consequently, electronic communications between the computer terminals continue to proliferate. However, questionable or malicious electronic communications and electronic communications whose veracity cannot be determined easily are increasingly prevalent. A needs exists for systems and methods that are capable of detecting malicious communications and mitigating the associated threats in real time across a plurality of computer terminals.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later. Embodiments of the invention relate to systems, computer-implemented methods, and computer program products (e.g., computer readable program code, and/or non-transitory tangible computer readable media): for detecting and mitigating malicious communications. The invention is typically configured to deliver indicators of compromise in response to identifying and isolating malicious communication. In some embodiments, the invention takes a form of a computerized system comprising a memory device with computer-readable program code stored thereon; a communication device, wherein the communication device is configured to establish operative communication with a plurality of networked devices via a communication network; one or more processing devices operatively coupled to the memory device and the communication device, wherein the one or more processing devices are configured to execute the computer-readable program code to perform one or more of the steps described herein.

The systems, computer-implemented methods, and computer program products are typically configured to receive, via a first operative communication channel, an electronic communication from a first networked device of the plurality of networked devices. The system may then analyze the electronic communication (i) to determine whether the electronic communication comprises a malicious attachment, (ii) to determine whether the electronic communication comprises a malicious Uniform Resource Locator (URL), and/or (iii) to determine whether the electronic communication is malicious. Based on determining that (i) the electronic communication comprises a malicious attachment, (ii) the electronic communication comprises a malicious URL, and/or (iii) the electronic communication is malicious, the system may then determine an indicator of compromise (IOC) associated with the electronic communication.

In some embodiments, subsequently, the system of the invention is configured to construct an indicator package configured for a threat prevention system of the first networked device, wherein the indicator package comprises the IOC, and transmit, via the first operative communication channel, the indicator package to the first networked device. In some embodiments, or in combination with any of the embodiments herein, transmitting the IOC to the first networked device comprises transmitting the indicator package to the first networked device.

In some embodiments, or in combination with any of the embodiments herein, subsequently, the system may transmit, via the first operative communication channel, a first feed comprising the IOC(s) (and/or the first indicator package) to the first networked device.

In some embodiments, or in combination with any of the embodiments herein, the system may transmit, a second feed comprising a second indicator package to the first networked device. The second indicator package typically comprises one or more other IOCs extracted from one or more other electronic communications received from one or more other entities not associated with the first networked device.

In some embodiments, or in combination with any of the embodiments herein, based on determining the IOC, the system transmits a threat trigger signal to a third-party provider system of a third party provider via the communication network. The threat trigger signal typically comprises the IOC. The threat trigger signal is typically structured to allow (i) a browser to block a threat caused by the electronic communication, wherein the browser is provided by the third-party provider system, (ii) a firewall application to block a threat caused by the electronic communication, wherein the firewall application is provided by the third-party provider system, or (iii) a software application to block a threat caused by the electronic communication, wherein the software application is provided by the third-party provider system. The browser, the firewall application and/or the software application is typically provided by the third-party provider for use by the recipient system. In some embodiments, the threat trigger signal is configured to allow multiple systems to block a threat caused by the electronic communication via browsers, firewalls and/or software applications provided by the third-party provider on those systems respectively. For instance, the threat trigger signal is structured to allow a browser provided by the third party provider for use by the second networked device (distinct from the first networked device or the recipient system) to block a threat caused by the electronic communication in real-time.

In some embodiments, or in combination with any of the embodiments herein, the system is further configured to transmit a threat elimination signal to a threat source system associated with the electronic communication, wherein the threat elimination signal is configured to notify the threat source system to remove a threat associated with the electronic communication.

Here, in some embodiments, or in combination with any of the embodiments herein, transmitting the threat elimination signal to the threat source system associated with the electronic communication further comprises: receiving, via the first operative communication channel, an indication to remove the threat caused by the electronic communication from a user of the first networked device; and identifying the threat source system associated with the electronic communication.

In some embodiments, or in combination with any of the embodiments herein, the system is further configured to transform the electronic communication into a structured format, wherein the transformation comprises converting the unstructured data of the electronic communication into structured format objects.

Here, in some embodiments, or in combination with any of the embodiments herein, transforming the electronic communication into the structured format further comprises converting the unstructured data into Java Script Object Notation objects.

In some embodiments, or in combination with any of the embodiments herein, the invention is structured to the one or more processing devices are configured to execute the computer-readable program code to assign a unique identifier to the electronic communication.

In some embodiments, or in combination with any of the embodiments herein, the invention is structured to analyze the electronic communication, to determine whether or not it is a spam communication. In some embodiments, or in combination with any of the embodiments herein, the invention is structured to identify whether or not the electronic communication comprises a predetermined pattern based on analyzing the electronic communication, wherein the predetermined pattern is associated with a prior spam communication. Here, the predetermined pattern typically comprises at least a portion of: a predetermined URL, a predetermined header field, a predetermined subject field, a predetermined message body field and/or a predetermined text content.

In some embodiments, or in combination with any of the embodiments herein, the indicator package is configured to enhance the threat prevention system of the first networked device in real-time, wherein the indicator package is constructed in a Structured Threat Information Expression format.

In some embodiments, or in combination with any of the embodiments herein, the indicator package is transmitted to the first networked device via Trusted Automated eXchange of Indicator Information format.

In some embodiments, or in combination with any of the embodiments herein, the invention is structured to identify that the electronic communication comprises an attachment based on analyzing the electronic communication. Based on (i) identifying, at a memory location, a prior malicious attachment matching the attachment and/or (ii) receiving a user input indicating that the attachment is malicious the system is structured to determine that the attachment is malicious.

In some embodiments, or in combination with any of the embodiments herein, the invention is structured to identify that the electronic communication comprises an attachment based on analyzing the electronic communication; transmit the attachment to a sandbox system; and determine that the attachment is malicious based on operating the attachment at the sandbox system.

In some embodiments, or in combination with any of the embodiments herein, the invention is structured to identify that the electronic communication comprises a URL based on analyzing the electronic communication. Based on (i) identifying, at a memory location, a prior malicious URL matching the URL and/or (ii) receiving a user input indicating that the URL is malicious, the system may determine that the URL is malicious.

In some embodiments, or in combination with any of the embodiments herein, the invention is structured to identify that the electronic communication comprises a URL based on analyzing the electronic communication. Next the system may determine that the URL is malicious based on at least identifying that the URL does not match the whitelist associated with the first networked device; and that the URL is not associated with a spam URL.

In some embodiments, or in combination with any of the embodiments herein, the invention is structured to identify that the electronic communication comprises a URL based on analyzing the electronic communication; determine whether the URL links to a payload; in response to determining that the URL links to the payload, transmit the URL to a sandbox system; and determine that the URL is malicious based on operating the payload at the sandbox system.

In some embodiments, or in combination with any of the embodiments herein, the invention is structured to analyze the electronic communication to determine whether the electronic communication comprises a malicious simulation signature and analyze the electronic communication (i) to determine whether the electronic communication comprises the malicious attachment, (ii) to determine whether the electronic communication comprises the malicious Uniform Resource Locator (URL), and/or (iii) to determine whether the electronic communication is malicious, in response to determining that the electronic communication does not comprise the malicious simulation signature.

In some embodiments, or in combination with any of the embodiments herein, the invention is structured to construct a simulated malicious electronic communication based on the electronic communication; transmit the simulated malicious electronic communication to the first networked device; and transmit a user training communication to the first networked device, wherein the user training communication is configured to provide training to a user of the first networked device for reporting malicious electronic communications, wherein the user training communication is transmitted (i) at a predetermined time period, or (ii) in response to determining a predetermined user action associated with the simulated electronic communication.

Here, in some embodiments, or in combination with any of the embodiments herein, the invention is structured to receive, via the first operative communication channel, the simulated electronic communication from the user of the first networked device; analyze the simulated electronic communication to determine whether the user correctly identified the simulated electronic communication as malicious; and in response to determining that the user correctly identified the simulated electronic communication as malicious, transmit a notification to the first networked device indicating successful identification of the simulated electronic communication by the user.

In some embodiments, or in combination with any of the embodiments herein, receiving the electronic communication further comprises receiving, via the first operative communication channel, a trigger signal associated with the electronic communication from the first networked device of the plurality of networked devices. Based on analyzing the trigger signal, the system is configured to retrieve the electronic communication from the first networked device.

In some embodiments, or in combination with any of the embodiments herein, the invention is structured to analyze a prior electronic communication stored at a first storage location and compare the electronic communication to the prior electronic communication stored at the first storage location. Comparing the electronic communication typically comprises comparing the unstructured data of the electronic communication with prior unstructured data of the prior electronic communication. Based on determining that at a predetermined portion of the unstructured data of the electronic communication matches a corresponding predetermined portion of the prior unstructured data of the prior electronic communication, the system logs the electronic communication at a log memory location. Moreover, based on determining that at the predetermined portion of the unstructured data of the electronic communication does not match the corresponding predetermined portion of the prior unstructured data of the prior electronic communication, the system stores the electronic communication at the first storage location.

In some embodiments, or in combination with any of the embodiments herein, the invention is structured to determine that the electronic communication is malicious based on receiving a user input indicating that the electronic communication is malicious.

In some embodiments, or in combination with any of the embodiments herein, determining the IOC associated with the electronic communication further comprises extracting the IOC from the electronic communication.

In some embodiments, or in combination with any of the embodiments herein, determining the IOC associated with the electronic communication further comprises receiving a user input comprising the IOC.

In some embodiments, or in combination with any of the embodiments herein, the invention is structured to receive, via the first operative communication channel, a second electronic communication from the first networked device. Based on determining that (i) the second electronic communication does not comprise a malicious attachment, (ii) the second electronic communication does not comprise a malicious URL, and (iii) the second electronic communication is not malicious, the system may label the second electronic communication as rejected.

In some embodiments, or in combination with any of the embodiments herein, the invention is structured to determine that the electronic communication is not a spam communication.

In some embodiments, or in combination with any of the embodiments herein, receiving the electronic communication comprises receiving a flagged electronic communication from the recipient system.

Moreover, embodiments of the invention relate to systems, computer-implemented methods, and computer program products (e.g., computer readable program code, and/or non-transitory tangible computer readable media): for detecting and mitigating malicious communications. These embodiments of the invention is typically configured to simulate malicious communications for user training purposes. The systems, computer-implemented methods, and computer program products of these embodiments are typically configured to receive, via a first operative communication channel, an electronic communication from a first networked device of the plurality of networked devices. The system may then analyze the electronic communication to determine whether the electronic communication comprises a malicious simulation signature. In response to determining that the electronic communication does not comprise the malicious simulation signature, the system may then analyze the electronic communication (i) to determine whether the electronic communication comprises a malicious attachment, (ii) to determine whether the electronic communication comprises a malicious Uniform Resource Locator (URL), and/or (iii) to determine whether the electronic communication is malicious. Based on determining that (i) the electronic communication comprises a malicious attachment, (ii) the electronic communication comprises a malicious URL, and/or (iii) the electronic communication is malicious, the system may then construct a simulated malicious electronic communication based on the electronic communication. Here, the system may transmit the simulated malicious electronic communication to the first networked device. Moreover, the system may transmit a user training communication to the first networked device, wherein the user training communication is configured to provide training to a user of the first networked device for reporting malicious electronic communications. Typically, this user training communication is transmitted (i) at a predetermined time period, or (ii) in response to determining a predetermined user action associated with the simulated electronic communication.

In some embodiments, the system of the invention is configured to identify at least one of one or more predetermined tactics, techniques and/or procedures associated with the electronic communication. Subsequently, based on the identified at least one of the one or more tactics, techniques and/or procedures, the system is configured to construct a simulation template. In some embodiments, the foregoing simulated malicious electronic communication is constructed based on the simulation template. Moreover, the foregoing user training communication is constructed based on the simulation template, in some embodiments.

In some embodiments, or in combination with any of the embodiments herein, subsequently, the system may receive, via the first operative communication channel, the simulated electronic communication from the user of the first networked device; analyze the simulated electronic communication to determine whether the user correctly identified the simulated electronic communication as malicious; and in response to determining that the user correctly identified the simulated electronic communication as malicious, transmit a notification to the first networked device indicating the successful identification of the simulated electronic communication by the user.

In some embodiments, or in combination with any of the embodiments herein, based on determining that (i) the electronic communication comprises a malicious attachment, (ii) the electronic communication comprises a malicious URL, and/or (iii) the electronic communication is malicious, the system may determine an indicator of compromise (IOC) associated with the electronic communication. Next, the system may construct an indicator package configured for a threat prevention system of the first networked device, wherein the indicator package comprises the IOC; and transmit, via the first operative communication channel, the indicator package to the first networked device.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein.

DETAILED DESCRIPTION OF EMBODIMENTS OF THE INVENTION

Figure 1:
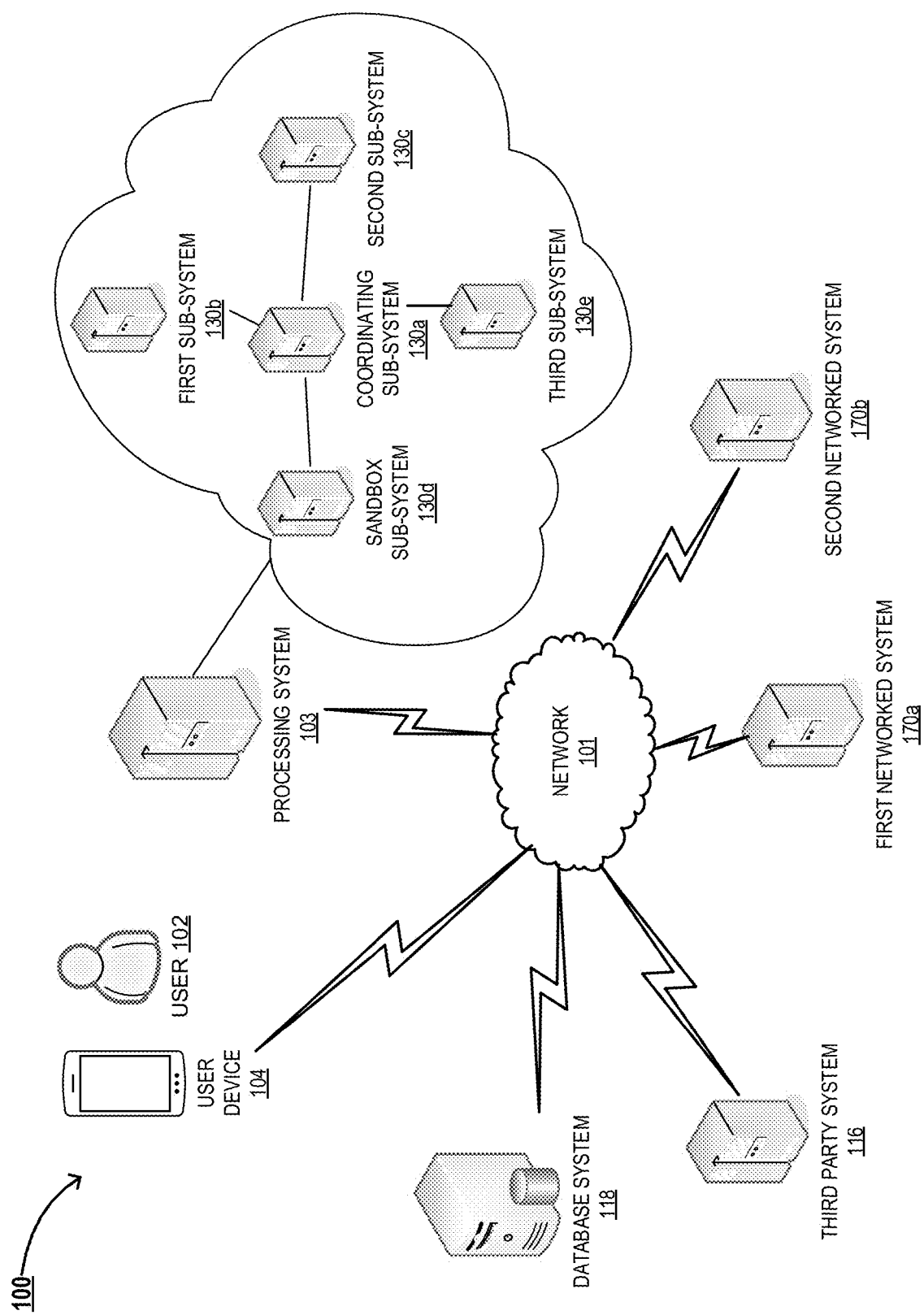
FIG. 1 illustrates a block network architecture diagram illustrating a system environment 100 for a security system for detection and mitigation of malicious communications, in accordance with some embodiments of the invention.

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on."

In some embodiments, an "entity" as used herein may be any institution, establishment or enterprise, associated with a communication network, associated with users or systems receiving electronic communication, associated with threat detecting systems, and/or the like. As such, the entity may be any institution, group, association, merchant, establishment, company, union, authority or the like. Typically, the entity is associated with one or more networked systems or networked devices (e.g., computer terminals, processing system, user devices, databases, third-party systems, and the like). Typically, the entity owns the one or more networked systems, operates one or more networked systems, provides the networked systems devices, facilitates services associated with the one or more networked systems, and/or is otherwise associated with the one or more networked systems.

As described herein, a "user" is an individual associated with an entity. As such, in some embodiments, the user may be an individual having past relationships, current relationships or potential future relationships with an entity. In some instances, a "user" is an individual who has a relationship with the entity, such as a client, a customer or a prospective customer. In some instances described herein, the user is an individual who seeks to utilize, operate, or perform one or more activities associated with one or more networked systems, typically based on successful validation of the user's authentication credentials. In some embodiments, a "user" may be an employee (e.g., a technology operator/technician, an associate, a project manager, an IT specialist, a manager, an administrator, an internal operations analyst, or the like) of the entity or enterprises affiliated with the entity, capable of operating the one or more networked systems described herein. In other embodiments, a user may be a system or an entity performing one or more tasks described herein.

Typically, the user may provide authentication credentials for conducting user activities or transactions at the one or more networked systems. In some embodiments, the one or more networked systems require the user to perform one or more authentication steps based on the level of authorization desired for a particular user activity or transaction. In this regard, for example, the user may slide cards with magnetic strips, provide one or more account numbers, user identifiers or userID and the like and further may provide the accompanying personal identification numbers (PIN), passwords, CVV numbers and the like associated with the individual computer terminal and/or the individual card/account provided for authentication.

As alluded to previously, computer terminals are widely used by individuals to perform a variety of activities and consequently, electronic communications between the computer terminals continue to proliferate. However, questionable or malicious electronic communications and electronic communications (e.g., emails, electronic messages, and the like) whose veracity cannot be determined easily are increasingly prevalent. These malicious communications may be capable of unauthorized access to the data and activities of the computer terminals, or may otherwise inflict damage to the data or functioning of the computer terminal. Moreover, these malicious electronic communications may be transmitted to a large number of systems, each employing different threat detection methods, making coordination of the identification and mitigation of the threats posed by the malicious electronic communications challenging.

The present invention addresses the foregoing needs and also provides improvement to technology by improving existing threat detection methods. The present invention is generally directed to a security system for receiving, analyzing and processing electronic communications, and questionable electronic communications in particular, to determine whether the questionable electronic communications are malicious. Moreover, the system is configured to identify indicators of compromise associated with malicious electronic communication and deliver the indicators to networked devices to help strengthen threat defense systems of the devices.

Specifically, the present invention is configured to rapidly identify and isolate malicious communications, using a unique combination of technical processes (e.g., duplication testing, sandbox testing, structured parsing and search of threat electronic communications, automatic classification of malicious URLs, automatic sandbox analysis of attachments, automatic extractions of IOCs from the sandbox system, and the like). The present invention is also configured to deliver critical information regarding threat mitigation of the identified malicious communications to a plurality of systems, in such a manner that the critical information can be easily incorporated into existing threat detection methods of these systems.

Moreover, in some instances, the system typically transmits a threat trigger signal to a third-party provider system via the communication network. The threat trigger signal comprises the IOC(s) and/or associated data. The threat trigger signal is structured to allow the browser provided by the third-party provider system on the first networked device or recipient system (and instances of the browser on other networked devices) to block a threat caused by the electronic communication based on the IOC(s), instantaneously or in real-time. By structuring the trigger signal to allow a browser of the first networked device (i.e., recipient system) to block the threat caused by the electronic communication and transmitting the trigger signal to a third-party provider system providing the browser, the present invention facilitates blocking of the threat at the first networked device, even though the first networked device may not have threat prevention systems that are configured to utilize IOC(s) to provide security against the threat. Moreover, the single trigger signal, effectuates blocking of the threat by a plurality of networked devices having instances of the browser provided by the third-party system, concurrently and in real-time, without requiring separate signals to each device of the plurality of networked devices.

Referring to FIG. 1, a block diagram illustrating a system environment 100 configured for providing a security system for detection and mitigation of malicious communications, is illustrated, in accordance with some embodiments of the invention. As illustrated, the system environment 100 comprises a processing system 103, in operative communication with one or more user devices 104 associated with a user 102, one or more networked systems (e.g., a first networked system 170a and a second networked system 170b), a database system 118, a third party system 116 and/or other systems/devices not illustrated herein, via a network 101. In some embodiments, the processing system 103 comprises one or more sub-systems. As illustrated by FIG. 1, the processing system 103 comprises one or more sub-systems, such as a coordinating sub-subsystem 130a, a first sub-system 130b, a second sub-system 130c, a sandbox sub-system 130d (also referred to as a sandbox system), a third sub-system 130e, in operative communication with each other. Although illustrated as separate sub-systems, it is understood that one or more of the sub-systems (e.g., sub-systems 130a-130e), in any suitable combination, may be embodied in the single processing system. For example, processors and other components of two or more of the sub-systems 130a-130e may be embodied as a single system, e.g., processing system 103. As another example, two or more of the sub-systems 130a-130e may be in the form of software and/or hardware modules that are embodied in a system, e.g., processing system 103.

As used henceforth, the "processing system 103", "the processing system" or "the system" may refer to one or more of the sub-systems 130a-130e. For example, in some embodiments, "the processing system" or "the system" refers to the coordinating sub-system 130a, which is typically structured to initiate, coordinate, control, and/or monitor activities of the other sub-systems (e.g., sub-systems 130b-130e). As such, the processing system 103 or the system is structured to perform one or more user activities at the system 103 itself (e.g., via operative communication with one or more sub-systems (e.g., sub-systems 130b-130e)), and/or via operative communication with external systems (e.g., the user device 104, the database system 118, the third-party system 116, one or more networked systems or devices (170a, 170b), and the like).

Typically, processing system 103 and the associated one of more of the sub-systems 130b-130e, are in electronic communication with the user device 104, the database system 118, the third-party system 116, and/or one or more networked systems or devices (170a, 170b), via the network 101, which may be the internet, an intranet or the like. Also, the one or more sub-systems 130b-130e maybe in electronic communication with each other via the network 101. In FIG. 1, the network 101 may include a local area network (LAN), a wide area network (WAN), a global area network (GAN), and/or near field communication (NFC) network. The network 101 may provide for wireline, wireless, or a combination of wireline and wireless communication between devices in the network. In some embodiments, the network 101 includes the Internet. In some embodiments, the network 101 may include a wireless telephone network. Furthermore, the network 101 may comprise wireless communication networks to establish wireless communication channels such as a contactless communication channel and a near field communication (NFC) channel (for example, in the instances where communication channels are established between the user device 104 and the processing system 103). In this regard, the wireless communication channel may further comprise near field communication (NFC), communication via radio waves, communication through the internet, communication via electromagnetic waves and the like.

The processing system 103 is a security system configured for detection and mitigation of malicious communications, for example, based on analyzing and processing electronic communications received from the first networked system 170a. The components of the processing system 103, e.g., sub-systems 130a-e, its features and functions will be described in detail through this disclosure and with respect to FIG. 2, in particular. As alluded to previously, in some embodiments, processing system 103, via the coordinating sub-system 130a, is configured to transmit control instructions that are configured to cause the sub-systems 103b-e, the user device 104, the database system 118, third party system 116 and/or the networked systems (170a, 170b) to perform at least a portion of the steps associated with one or more activities. The sandbox sub-system 130d is an insulated system or environment configured for sandbox analysis described later on. The first, second and third sub-systems (130b. 130c, 130e) may be configured to perform one or more of the steps described herein. For example, the first sub-system 130b may be configured to run an electronic communication management application, described later on.

The processing system, 103 and the coordinating sub-system 103a in particular may be associated with the same entity as the one or more of the sub-systems 130b-e, the networked systems (170a, 170b), user device 104, and/or other systems. In other instances processing system, 103 and the coordinating sub-system 103a in particular may be associated with a different entity than as that of one or more of the sub-systems 130b-e, the networked systems (170a, 170b), user device 104, and/or other systems.

As discussed previously, the system 103 is typically in operative communication with one or more networked systems 170. FIG. 1 illustrates one example of the system 103 in operative communication with a first networked system 170a and a second networked system 170b, although it is understood that more or fewer networked systems 170 may be employed. Typically, the networked systems (170a, 170b) (also referred to as "recipient systems") receive electronic communications, as direct recipients or indirect recipients, as described with respect to FIG. 5. Questionable communications (e.g., potentially malicious electronic communications or electronic communications whose provenance/veracity is not readily apparent/verifiable) received at the networked systems (170a, 170b) may be flagged by the networked systems (170a, 170b), individuals utilizing the networked systems (170a, 170b) and/or the processing system 103. Typically, these flagged questionable electronic communications are not opened or otherwise acted upon (e.g., opening a URL or an attachment of the electronic communication, replying to the electronic communication etc.), because it may be unknown whether the actions would result in the electronic communication causing a threat or initiation of unauthorized actions by the electronic communication on the networked system. Instead, the flagged questionable electronic communications are transmitted or reported to the processing system 103 (e.g., the coordinating sub-system 130a) by the networked systems (170a, 170b) or individuals associated with the networked systems (170a, 170b), and/or the processing system 103 itself, either periodically, or in real-time as the communications are received or flagged. The flagged electronic communications are analyzed and processed at the processing system 103, as will be described in detail below. In the instances where one or more of the flagged electronic communications are determined to be malicious by the processing system 103, the processing system 103 is typically structured to extract critical information such as indicators of compromise (IOCs) from the malicious electronic communications and transmit the IOCs to some or all of the networked systems (170a, 170b), and specifically to third party provider systems. The IOCs are structured such that the networked systems (170a, 170b) may incorporate the IOCs into existing threat defense systems (e.g., software, browser applications, internet blocking, access authorization applications and systems, and the like) of the networked systems (170a, 170b) to enhance their defense against the identified malicious communications. The structure and components of the processing system 103 are described in detail with respect to FIG. 2, and the networked systems are described with respect to FIG. 3.

The processing system 103 may further communicate with the third party system 116 and/or the database system 118. The database system 118 may comprise prior processing and analysis data comprising historically or previously identified malicious electronic communications, malicious URLs, malicious attachments, unsolicited or spam electronic communications, URLs or attachments associated with spam, and the like. The database system 118 may be separate from the system 103, or alternatively integrated as data repositories or memory storage of one or more of the sub-systems 130a-e (e.g., data repository 256), the networked device (170a, 170b) (e.g., data repository 356) and/or the user device 104 (e.g., memory 420). The processing system 103 (e.g., one or more of the sub-systems 130a-e) may retrieve the historical data from the database system 118 during analysis/processing of electronic communications.

The user device 104 may comprise a mobile communication device, such as a cellular telecommunications device (i.e., a smart phone or mobile phone), a computing device such as a laptop computer, a personal digital assistant (PDA), a mobile internet accessing device, or other mobile device including, but not limited to portable digital assistants (PDAs), pagers, mobile televisions, gaming devices, laptop computers, cameras, video recorders, audio/video player, radio, GPS devices, any combination of the aforementioned, or the like. As discussed previously, in some embodiments, the processing system 103 of the present invention is configured to establish operative communication channels with the user device 104 such that, the user 102 may perform one or more user activities described herein, either entirely or in part, (e.g., perceive displayed data, provide user input, perform actions on one or more electronic communications etc.). In some instances, the user device 104 may be a device (e.g., a recipient system or a first networking device) utilized by recipient individuals to whom the questionable communications are addressed to. In other instances, the user device 104 may be a device utilized by users, associates, experts or technicians associated with the processing system 103, that is used to provide user input, view electronic communication processing, and the like. The user device 104 is described in detail with respect to FIG. 4.

Figure 2:
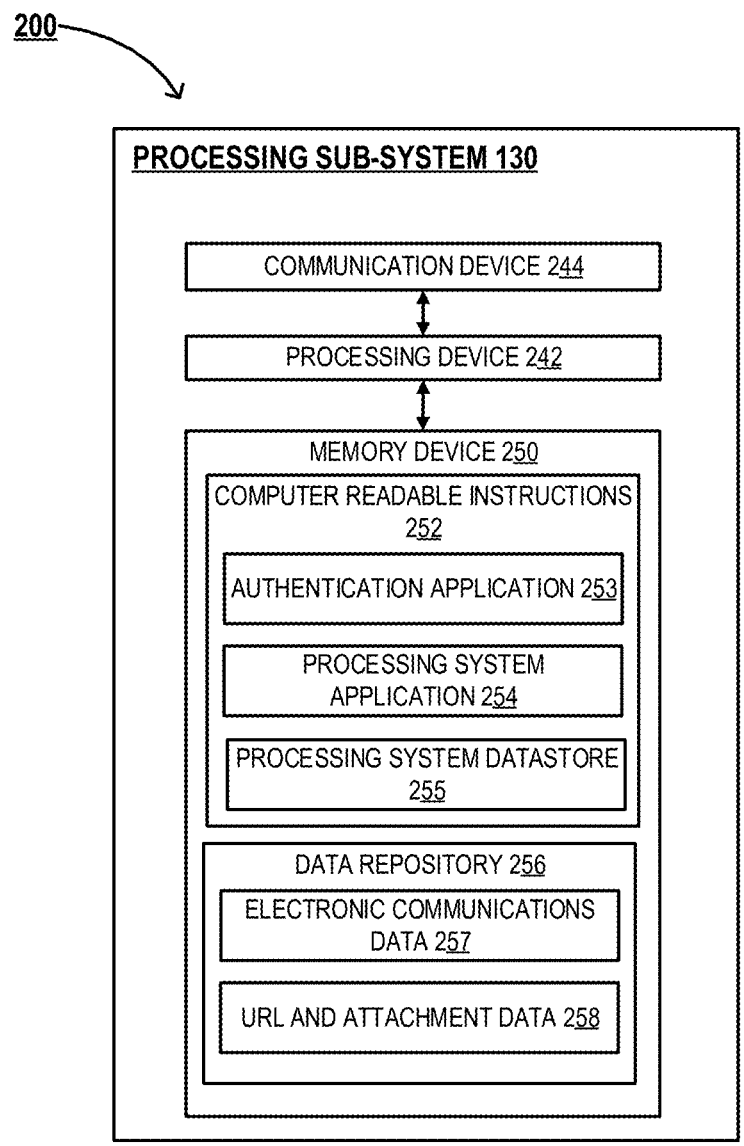
FIG. 2 illustrates a block diagram 200 of a processing sub-system, in accordance with some embodiments of the invention.

FIG. 2, illustrates a block diagram 200 of a processing sub-system 130, in accordance with some embodiments of the invention. The processing system 103, the coordinating sub-subsystem 130a, the first sub-system 130b, the second sub-system 130c, the sandbox system 130d, the third sub-system 130e typically comprise a substantially similar structure and functionality as described with respect to the processing sub-system 130.

The processing device 242 may generally refer to a device or combination of devices having circuitry used for implementing the communication and/or logic functions of the processing system 103 and/or the sub-systems 130a-e. A "processing device" as referred to herein may comprise one or more processing devices configured for at least partially completing the steps described herein. Although termed as a processing device 242, the processes described herein may be performed at least partially by multiple processing devices, working in tandem, in series or in any suitable combination. Moreover, the processing device 242 may also refer to processing devices of each of the sub-systems 130a-e.

The processing device 242 may include a control unit, a digital signal processor device, a microprocessor device, and various analog-to-digital converters, digital-to-analog converters, and other support circuits and/or combinations of the foregoing. Control and signal processing functions of the processing system 103, and the sub-systems 130 (e.g., sub-systems 130a-e), in particular, may be allocated between these processing devices according to their respective capabilities.

The processing sub-system 130 may further include various components/devices in operative communication with and/or controlled by the processing device 242, such as a communication device 244, user input devices (not illustrated), a memory device 250, a data repository 256, and/or the like. These components and devices are described in detail below. Furthermore, in some embodiments, the processing device 242 is operatively coupled to and is configured to control other components/devices such as the networked device (170a, 170b), the user device 104, database system 118, and the like.

The memory device 250 may generally refer to a device or combination of devices that store one or more forms of computer-readable media for storing data and/or computer-executable program code/instructions. In some embodiments, the memory device 250 comprises a non-transitory, computer readable storage medium. For example, the memory device 250 may include any computer memory that provides an actual or virtual space to temporarily or permanently store data and/or commands provided to the processing device 242 when it carries out its functions described herein.

As illustrated by FIG. 2, the memory device 250 typically comprises a processing system application 254 (also referred to as a system application), an authentication application 253, and a processing system datastore 255 stored therein. In some embodiments, the authentication application 253 is integral with the processing system application 254. In some embodiments, the processing system application 254 may be executable to initiate, perform, complete, and/or facilitate one or more portions of any embodiment described and/or contemplated herein, either independently or in response to receiving control instructions from the processing system 103 (e.g., based on receiving instructions from the coordinating sub-system 103a). In some embodiments, the processing system application 254 comprises computer readable instructions or program code stored in the memory device 250, which when executed by the processing device 242, are configured to cause the processing device 242 to perform one or more steps of the embodiments presented herein, and/or cause the processing device to transmit control instructions to other components of the sub-system 130 and other devices/systems in the network 101 to cause them to perform the steps. Generally, the processing system application 254 is executable to receive activity instructions from the user and perform user activities and the various steps described herein. The processing system application 254 may be coupled to the processing system datastore 255 for storing application data associated with the application 254. The processing system datastore 255 may store the application data temporarily for the predetermined duration of the execution of the activity (such as a memory buffer, or cache memory), or permanently. The sub-system 130 may require users to identify and/or authenticate themselves before initiating, performing, completing, and/or facilitating a user activity as described previously.

The communication device 244 may comprise a modem, a receiver, a server, a transmitter, transceiver, and/or another device (not illustrated) for communicating with other devices and systems on the network 101. The communication device 244 may further comprise a contact, contactless, wireless and/or wired interface that is configured to establish communication between components of the sub-system 130, between the sub-systems 130a-130e, and other devices or systems, such as the user device 104, the database 118, the third party system 116, the networked device (170a, 170b) and the like. In this regard, in some instances, the communication interface 270 comprises a transmitter, a receiver, and a broadcasting device to transmit and receive signals from corresponding devices via a suitable transmission medium or a communication channel.

Furthermore, a "user interface" (not illustrated) may be associated with the processing sub-system 130 and may generally include a plurality of interface devices and/or software that allow a user to input commands and data to direct the processing device to execute instructions. For example, the user interface may include a graphical user interface (GUI) or an interface to input computer-executable instructions that direct the processing device to carry out specific functions. The user interface of the processing sub-system 130 may include user input devices and user output devices (not illustrated). The user interface of the processing sub-system 130 is typically configured to facilitate the interactive sessions with the user. The user output devices typically include a display (e.g., a liquid crystal display, a touchscreen display, and/or the like) which is operatively coupled to the processing device 242. The user interface may include any number of user input devices 240 allowing the processing sub-system 130 to transmit/receive data to/from the user 102, such as a keypad, keyboard, touch-screen, touchpad, microphone, mouse, joystick, other pointer device, button, soft key, and/or other input device(s). A printer that can print paper receipts may also be incorporated into the processing sub-system 130.

As illustrated, the processing sub-system 130 may comprise a data repository 265 which is configured to store prior processing and analysis data comprising electronic communication data 257 associated with historically or previously received electronic communications and/or electronic communications that are currently being processed, comprising, logs of received electronic communications, metadata, unique identifiers, structured/unstructured data, processing status, previous analysis/processing results, whitelisted electronic communications and the like associated with the electronic communications. The data repository 265 further comprises URL and attachment data 256 associated with historically or previously identified malicious URLs, malicious attachments, unsolicited or spam electronic communications, URLs or attachments associated with spam, whitelisted attachments and URLs and/or the like.

Figure 3:
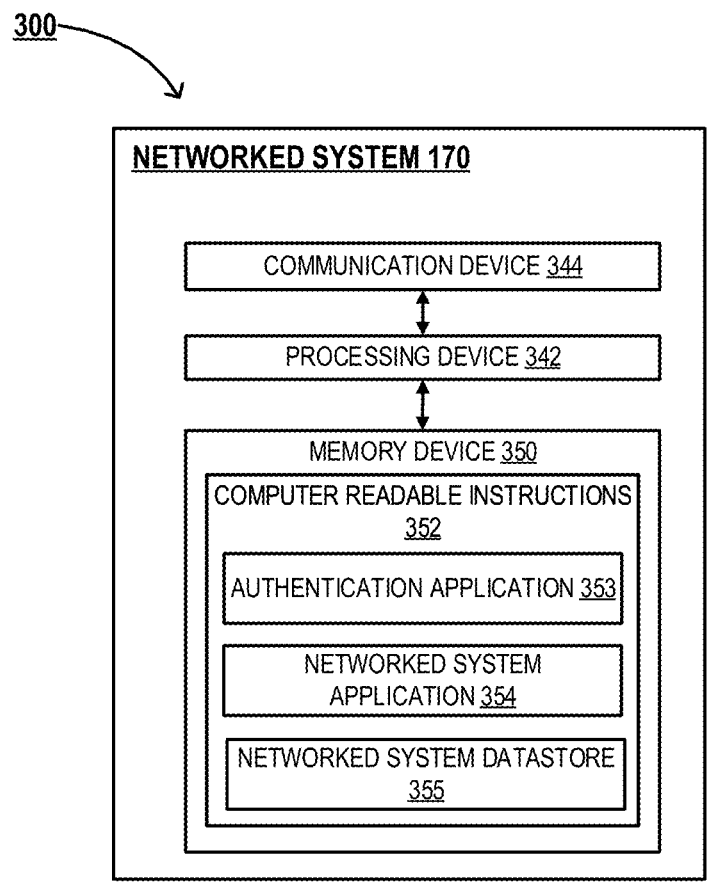
FIG. 3 illustrates a block diagram 300 of a networked system, in accordance with some embodiments of the invention.

FIG. 3 illustrates a block diagram 300 of the networked system or device 170 (e.g., first networked system 170a) in accordance with some embodiments of the invention. As such, the networked system or device 170 described herein may refer to a first networked system or recipient system, a third-party provider system, and/or other networked system. As illustrated in FIG. 3, the networked system 170 may include a communication device 344, a processing device 342, and a memory device 350 having an authentication application/module 353, a networked system application 354 and a networked system datastore 355 stored therein. As shown, the processing device 342 is operatively connected to and is configured to control and cause the communication device 344, and the memory device 350 to perform one or more functions. It will be understood that the authentication application 353 and/or the networked system application 354 may be executable to initiate, perform, complete, and/or facilitate one or more portions of any embodiments described and/or contemplated herein, and specifically embodiments directed to user activities. The communication device 344 may generally include a modem, server, transceiver, and/or other devices for communicating with other devices on the network 101. The communication device 344 may be a communication interface having one or more communication devices configured to communicate with one or more other devices on the network 101.

Additionally, referring to the networked system 170 illustrated in FIG. 3, the processing device 342 may generally refer to a device or combination of devices having circuitry used for implementing the communication and/or logic functions of the networked system 170. For example, the processing device 342 may include a control unit, a digital signal processor device, a microprocessor device, and various analog-to-digital converters, digital-to-analog converters, and other support circuits and/or combinations of the foregoing. Control and signal processing functions of the system 170 may be allocated between these processing devices according to their respective capabilities. The processing device 342 may further include functionality to operate one or more software programs based on computer-executable program code 352 thereof, which may be stored in a memory device 350, such as the networked system application 354 and the authentication application 353. As the phrase is used herein, a processing device may be "configured to" perform a certain function in a variety of ways, including, for example, by having one or more general-purpose circuits perform the function by executing particular computer-executable program code embodied in computer-readable medium, and/or by having one or more application-specific circuits perform the function. The processing device 342 may be configured to use the network communication interface of the communication device 344 to transmit and/or receive data and/or commands to and/or from the other devices/systems connected to the network 101.

The memory device 350 within the networked system 170 may generally refer to a device or combination of devices that store one or more forms of computer-readable media for storing data and/or computer-executable program code/instructions. For example, the memory device 350 may include any computer memory that provides an actual or virtual space to temporarily or permanently store data and/or commands provided to the processing device 342 when it carries out its functions described herein. The networked system 170 may further comprise a user data repository (not illustrated).

Figure 4:
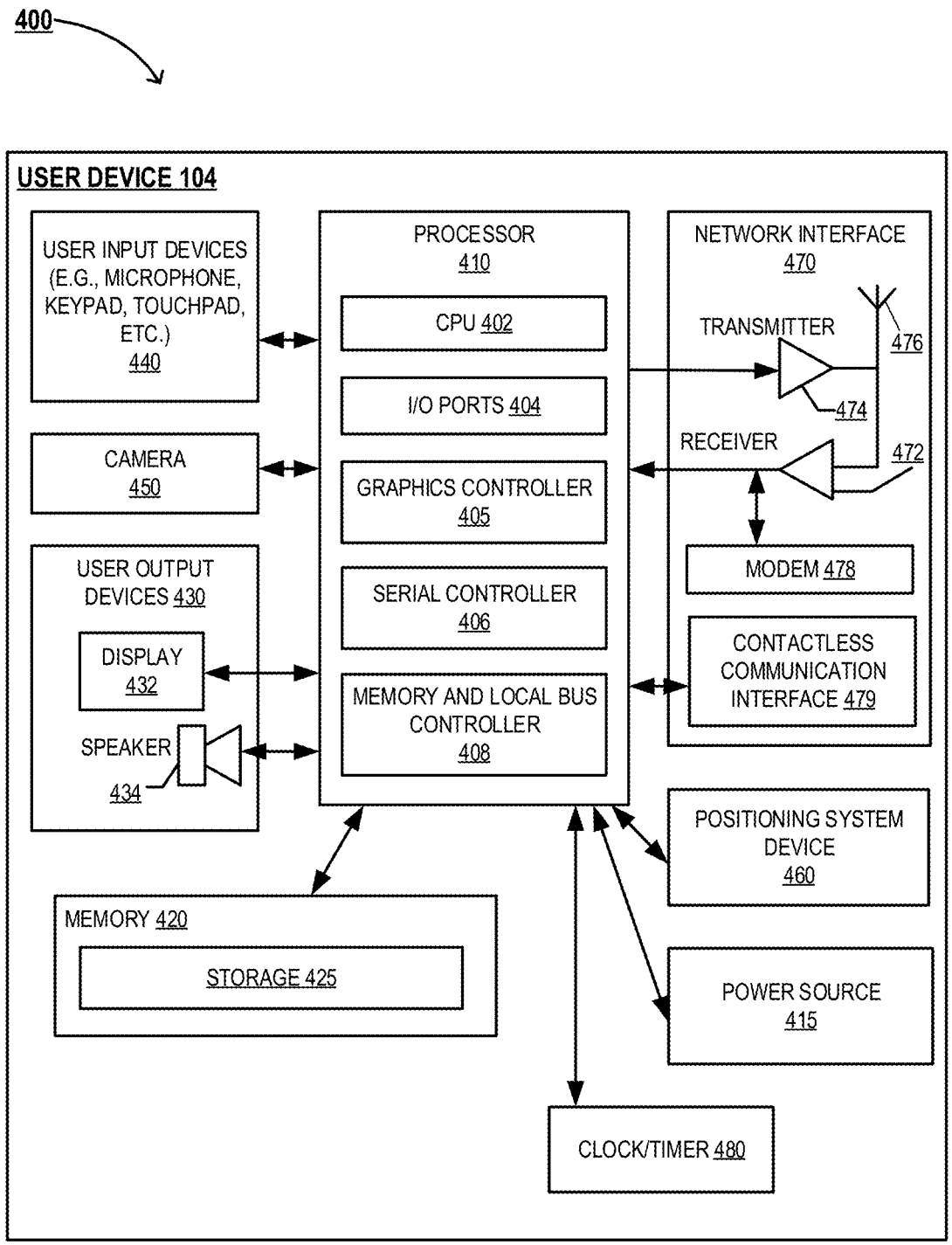
FIG. 4 illustrates a block diagram 400 of a user device, in accordance with some embodiments of the invention.

FIG. 4 illustrates a block diagram 400 of the user device 104, such as a user mobile device, in accordance with some embodiments of the invention. A "mobile device" 104 may be any mobile communication device, such as a cellular telecommunications device (i.e., a cell phone or mobile phone), personal digital assistant (PDA), a mobile Internet accessing device, or another mobile device including, but not limited to portable digital assistants (PDAs), pagers, mobile televisions, gaming devices, laptop computers, cameras, video recorders, audio/video player, radio, GPS devices, any combination of the aforementioned devices.

The mobile device 104 may generally include a processing device or processor 410 communicably coupled to devices such as, a memory device 420, user output devices 430 (for example, a user display device 432, or a speaker 434), user input devices 440 (such as a microphone, keypad, touchpad, touch screen, and the like), a communication device or network interface device 470, a power source 415, a clock or other timer 480, a visual capture device such as a camera 450, a positioning system device 460, such as a geo-positioning system device like a GPS device, an accelerometer, and the like, one or more chips, and the like. The processor 410 may further include a central processing unit 402, input/output (I/O) port controllers 404, a graphics controller 405, a serial bus controller 406 and a memory and local bus controller 408. The processor 410 may include functionality to operate one or more software programs or applications, which may be stored in the memory device 420 and operate on data stored in storage 425.

The processor 410 may be configured to use the network interface device 470 to communicate with one or more other devices on a network 101 such as, but not limited to the processing system 103. In this regard, the network interface device 470 may include an antenna 476 operatively coupled to a transmitter 474 and a receiver 472 (together a "transceiver"), modem 478 and a contactless communication interface 479. The processor 410 may be configured to provide signals to and receive signals from the transmitter 474 and receiver 472, respectively. The signals may include signaling information in accordance with the air interface standard of the applicable BLE standard, cellular system of the wireless telephone network and the like, that may be part of the network 101.

The network interface device 470 or communication device 470 may also include a user activity interface presented in user output devices 430 in order to allow a user 102 to execute some or all of processes described herein. The application interface may have access to the hardware, for example, the transceiver, and software previously described with respect to the network interface device 470. Furthermore, the application interface may have the ability to connect to and communicate with an external data storage on a separate system within the network 101. As described above, the mobile device 104 includes a display device 432 having a user interface that includes user output devices 430 and/or user input devices 440. The user output devices 430 may include a display 432 (e.g., a liquid crystal display (LCD) or the like) and a speaker 434 or other audio device, which are operatively coupled to the processor 410. The user input devices 440, which may allow the mobile device 104 to receive data from the user 102, may include any of a number of devices allowing the mobile device 104 to receive data from a user 102, such as a keypad, keyboard, touchscreen, touchpad, microphone, mouse, joystick, other pointer device, button, soft key, and/or other input device(s).

The mobile device 104 may further include a power source 415. Generally, the power source 415 is a device that supplies electrical energy to an electrical load. In some embodiment, power source 415 may convert a form of energy such as solar energy, chemical energy, mechanical energy, and the like, to electrical energy. Generally, the power source 415 in a mobile device 104 may be a battery, such as a lithium battery, a nickel-metal hydride battery, or the like, that is used for powering various circuits, for example, the transceiver circuit, and other devices that are used to operate the mobile device 104. Alternatively, the power source 415 may be a power adapter that can connect a power supply from a power outlet to the mobile device 104. In such embodiments, a power adapter may be classified as a power source "in" the mobile device 104.

In some instances, various features and functions of the invention are described herein with respect to a "system." In some instances, the system may refer to the processing system 103 (e.g., the coordinating sub-system 130a, the coordinating sub-system 130a in conjunction with other sub-systems 130b-e, etc.). In some instances, the system refers to the devices and systems on the network environment 100 of FIG. 1. The features and functions of various embodiments of the invention are be described below in further detail.

Figure 5:
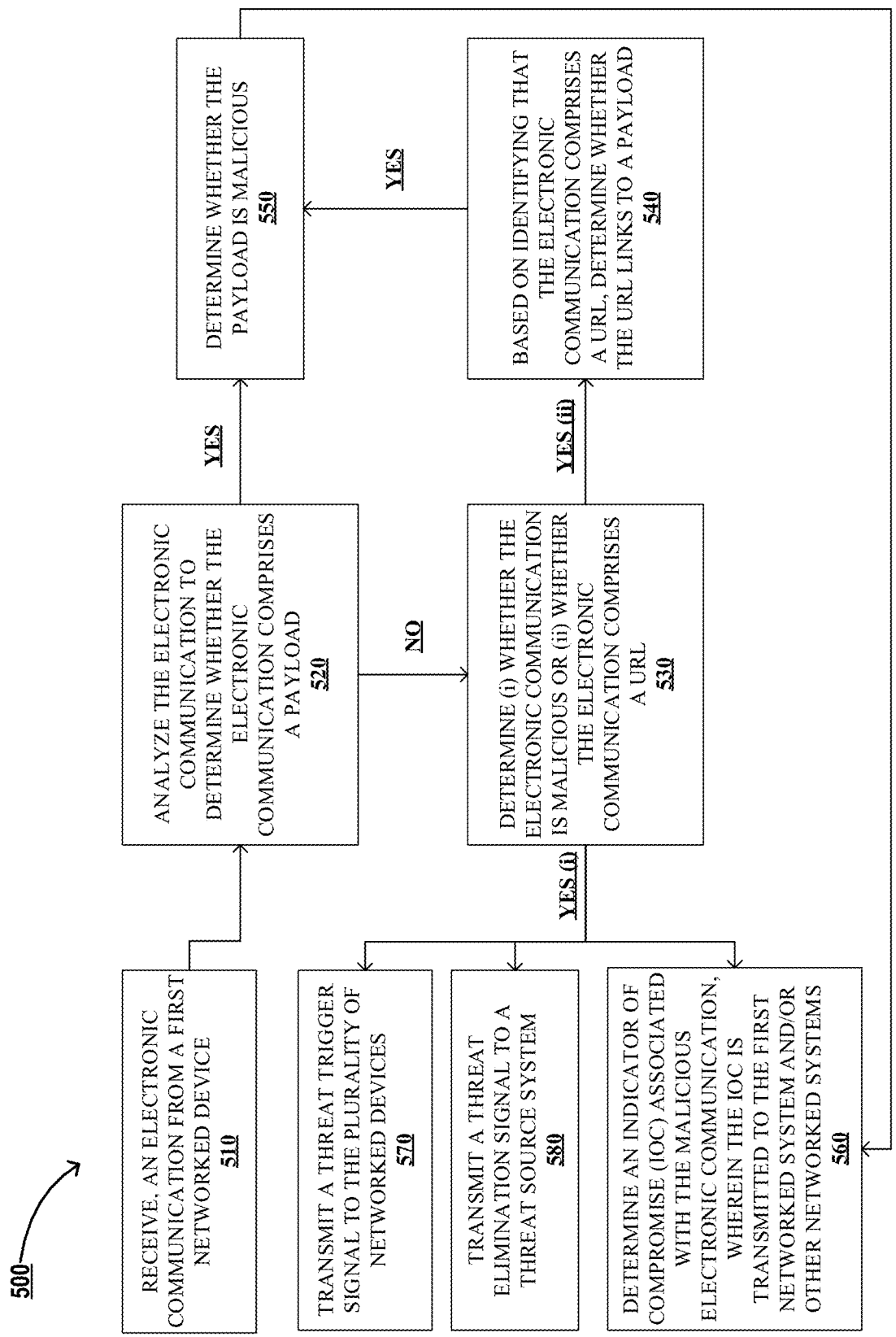
FIG. 5 illustrates a high level process flow 500 for detection and mitigation of malicious communications, in accordance with some embodiments of the invention.

FIG. 5 illustrates a high level process flow 500 for a security system for detection and mitigation of malicious electronic communications, in accordance with some embodiments of the invention. As discussed previously, the processing system receives an electronic communication (e.g., a questionable or flagged electronic communication) from a first networked device, as indicated by block 510. Typically, the "first networked device", also referred to as a "recipient system," is the addressee or recipient of the questionable electronic communication. The electronic communication, along with other questionable or flagged electronic communications may be received at the processing system, via a first operative communication channel between the first networked device and the processing system (e.g., via network 101). In some embodiments, the electronic communication comprises unstructured data (e.g., data in the form that it was received at the first networked device).

In some embodiments, the first networked device or the recipient system is a direct addressee and/or receiver of the questionable electronic communication. The questionable electronic communication may be addressed to and/or sent to a recipient individual or a client individual associated with the first networked device or the recipient system.

Examples of such a first networked device or recipient system include a personal computing device, a laptop computer, a smartphone, a mobile device, and the like, which are utilized by the recipient individual to receive/view electronic communications or indications/notifications of electronic communications, operate on received electronic communications, flag questionable electronic communications, and/or perform other actions. One or more of the electronic communications received at the first networked device or the recipient system may then be flagged as being questionable, by the recipient individual, by an electronic communication security application of the recipient system, and/or by the processing system. The one or more flagged or questionable electronic communications are then transmitted to the processing system. For example, the recipient individual may "forward" or re-send the questionable electronic communications to the processing system (e.g., to an electronic communication box address associated with the processing system). Alternatively, the processing system may retrieve the questionable electronic communications from the recipient system, for example, based on receiving a trigger signal from the recipient system as described with respect to FIG. 6.

In some embodiments and/or in combination with the above embodiment, the first networked device or the recipient system is an indirect addressee and/or receiver of the questionable electronic communication. The questionable electronic communication may be addressed to and/or sent to one or more recipients (e.g., recipient individuals) via a first networked device or recipient system associated with an entity (e.g., an organization employing the recipient individuals). Examples of such a first networked device or recipient system include entity electronic communication servers, entity firewall systems, entity electronic communication devices or software, and/or the like, which are utilized by the entity and/or recipient individuals associated with the entity, to receive/view electronic communications or indications/notifications of electronic communications, operate on received electronic communications, flag questionable electronic communications, and/or perform other actions. Referring to an example of an electronic communication addressed to a first recipient individual who is an employee of a first entity/organization, the electronic communication may first be received at an entity system or device (e.g., entity firewall system, entity communications server) before being transmitted to a computing device of the recipient individual. In such instances, the entity system/device (e.g., entity firewall system, entity communications server) may at least partially filter/review incoming electronic communications before sending them to the recipient individual's device and/or transmit questionable electronic communications to the processing system. Here, the entity system or device (e.g., entity firewall system, entity communications server) may be an indirect type first networked device or recipient system, whereas the computing device of the recipient individual may be a direct type first networked device.

Typically, the first networked device or recipient system is not a third-party provider system, as defined below with respect to block 570. In particular, the recipient system or the first networked device is associated with (e.g., owned or operated by) a direct or indirect recipient of the electronic communications, and not third-party provider systems that generally provide email services/software, browser software and the like.

The system may then analyze the electronic communication to determine whether the electronic communication comprises a payload, such as at least one attachment, as illustrated by block 520. In response to determining that the electronic communication does not comprise a payload comprising at least one attachment, at block 530 the system determines (i) whether the electronic communication itself is malicious or (ii) whether the electronic communication comprises a uniform Resource Locator (URL).

In response to determining that the electronic communication comprises a uniform Resource Locator (URL), at block 540, the system determines whether the URL links to a payload. In some instances, "payload" as used herein refers to a file (e.g., an executable file) attached to the electronic communication. In some instances, "payload" as used herein refers to the action caused by opening a URL. For example, in the instances where the URL links to a file or causes the automatic or unauthorized download of a file when opened/acted upon, the file linked to the URL maybe referred to as the payload. In some instances, a "payload" refers to a part or portion of the electronic communication which is configured to perform or initiate a malicious or unauthorized action. Examples of unauthorized or malicious actions may include deleting data, sending spam, encrypting data, unauthorized downloads, unauthorized data access/retrieval or interception and the like.

Based on identifying, at block 520, that the electronic communication comprises a payload attachment, and/or identifying, at block 540, that a URL of the electronic communication links to a payload, the system determine whether the payload is malicious at block 550.

In response to determining that (i) the electronic communication is malicious at block 530, and/or (ii) the electronic has a malicious payload or includes a URL to a malicious payload at block 550, the system determines an indicator of compromise (IOC) (or multiple IOCs) associated with the electronic communication, at block 560. In some instances, IOCs refer to an artifact associated with the electronic communication, a portion of the electronic communication, or metadata associated with the electronic communication which indicates that the electronic communication is malicious and which is structured allow to identification of future malicious electronic communications corresponding to the IOCs. In some instances, IOCs comprise malicious electronic communication signatures, virus signatures, IP addresses, MD5 hashes of malware attachments/files/payloads, malicious attachment hashes, and/or URLs or domain names of botnet command and control servers. In some embodiments, IOCs refer to portions of the electronic communication such as email subject, email reply to, sender's IP address, email mailer identifier, email header, from domain, to domain, text in the body of the electronic communication (e.g., email, cellular or SMS text message, etc.), links in the text of the electronic communication, identifying number of the sender of a cellular text message, response contact information provided in the text or body of the email, and/or the like. In some embodiments, IOCs refer to artifacts or data associated with links or URLs in the electronic communication such as domain of the URL/link, IP address of the link, registrant information associated with the link, type of link (e.g., redirect type link), and the like. In some embodiments, IOCs refer to artifacts or data associated with attachments of the electronic communication such as, filename, size of the attachment, extension type of the attachment, registrant information associated with the domain/source of the attachment, business sectors typically targeted by the attachment or similar attachments, and the like.

These determined IOCs are then transmitted to the first networked device (i.e., the recipient system of the electronic communication), and/or other networked devices (i.e., networked devices that are not the recipients of the electronic communication, or networked devices from which the electronic communication was not received by the system) in any suitable form (e.g., in the form of an indicator package containing the IOCs). For example, a first entity associated with the first networked device (i.e., the recipient system of the electronic communication) may be a client/customer of the security system. The "other networked devices" (e.g., a second networked device, a third networked device, etc.) may be association with one or more entities, different from the first entity, that are also clients of the security system. As discussed, after IOCs have been identified during processing, they can be used for early detection of future attack attempts using threat prevention systems or threat defense systems (e.g., intrusion detection systems and antivirus software) of networked devices (e.g., the recipient system of the electronic communication and other networked systems that are not recipients of the electronic communication).

In turn, the system typically transmits to the first networked device (e.g., via the first operative communication channel): (i) a first threat defense feed comprising IOCs determined by the system that are associated with electronic communications initially received at or that were directed to the first networked device, and/or (ii) a second threat defense feed comprising IOCs determined by the system that are associated with electronic communications received at other networked devices (e.g., devices associated with other clients). In this way, the system allows for enhanced detection of threats at the first networked device based on the electronic communications received at the first networked device and also electronic communications received at other networked devices. In some embodiments, the system may configure the second threat defense feed such that the first networked device receives IOCs that are associated with electronic communications that are similar to the type of electronic communications typically received by the first networked device, and/or IOCs that are associated with electronic communications received at the networked systems, whose users, entities or organization is similar to that of the first networked device.

In some embodiments, in addition to identifying the IOC(s), the system is configured to analyze the malicious electronic communications to identify TTPs (Tactics, Techniques, and Procedures) associated with the malicious electronic communications. Typically, TTPs refer to strategies, infection vectors, behavioral aspects and other traits and practices employed by the malicious electronic communication or the threat entities associated with the malicious electronic communication. The system may automatically identify the TTPs by first identifying "Lures" contained on the electronic communication. The lures may comprise text and graphics included in the electronic communication, for example, in the body and/or header/subject field of the communication. The system may analyze these lures to identify the Tactics, Techniques, and Procedures (e.g., the system identifies either new TTPs or identifies TTPs at least partially based on previous analyses or previously identified TTPs) associated with the electronic communication. In some embodiments, the system may seek to identify predetermined types of one or more of Tactics, Techniques, and Procedures. In some embodiments, the system utilizes these identified one or more tactics, techniques, and procedures as a basis for constructing the simulated electronic communications. Specifically, the system may construct templates based on the identified TTPs, which are in turn utilized to construct simulated electronic communications and construction of user training communications for training purposes, via a training platform, as will be described with respect to FIG. 6. In some embodiments, the identified TTPs are analyzed and grouped to construct and develop training content for training the user via the training platform, in addition to constructing the simulated electronic communications. As such, the training content may comprise custom simulation training campaigns (e.g., training content constructed based on user input/requirement), interactive training content, training videos and the like.

As illustrated by block 570, in some embodiments, the system is configured to transmit threat trigger signals associated with the determined malicious electronic communication to enable rapid browser/internet blocking of the threat/malicious electronic communication, in real-time. Specifically, the system may transmit a threat trigger signal to a third-party provider system, which is a system or of a third party provider. In some embodiments, a third party provider may provide browsers for use on one or more networked devices (e.g., the recipient system or the first networked device, a second networked device, 170a, 170b, and the like). In some embodiments, a third party provider may provide operating systems, software applications and/or firewall systems/applications for use on one or more networked devices (e.g., the recipient system or the first networked device, a second networked device, 170a, 170b, and the like). In some embodiments, the third-party provider refers to a browser provider that provides web browsers or other software applications for traversing information spaces such as the World Wide Web. Examples of such third-party providers include Google Inc. who provides Google Chrome browsers, Microsoft which provides Microsoft Edge browsers, Mozilla Corporation which provides Mozilla Firefox browser, Apple Inc. which provides Safari browser and the like. In some embodiments, the third-party provider refers to an electronic mail provider who provides electronic communication and personal information management software and/or web-based applications, Webmail providers and the like. Examples of such third-party providers include Google Inc. which provides Gmail service, Microsoft which provides Microsoft Outlook service, Apple Inc. which provides Mail.app and the like. As such, a "browser" as used herein may refer to (i) browser software/applications and web-based browsers for traversing the information spaces such as the World Wide Web, (ii) Webmail services, electronic communication and personal information management software and/or other software or web-based applications for electronic communication transmission and management, electronic messaging and/or (iii) other web-portals and search engines. As such, typically, the third-party provider system is not a system of the recipient or the addressee, and instead refers to a system of a third party that generally provides email services/software, browser software, operating systems, software applications and the like for use by the recipient system.

Typically, the threat trigger signal is structured to allow browsers of each of the plurality of networked devices, provided by the third-party provider system, to block a threat caused by the electronic communication and/or future malicious communications corresponding to the electronic communication. In some embodiments, the threat trigger signal is transmitted to the third-party provider system instead of transmitting the IOCs or the indicator package to the first networked device (i.e., the recipient system) and/or other systems of the recipient, while in other embodiments the threat trigger signal is transmitted to the third-party provider system in addition to transmitting the IOCs or the indicator package to the first networked device (i.e., the recipient system).

In particular, the system typically transmits a threat trigger signal to a third-party provider system via the communication network. The threat trigger signal comprises the IOC(s) and/or associated data. In some embodiments, the threat trigger signal is structured to allow the browser provided by the third-party provider system on the first networked device or recipient system (and instances of the browser on other networked devices) to block a threat caused by the electronic communication based on the IOC(s), instantaneously or in real-time. In a similar manner, other instances of the browser provided on other networked devices by the third-party provider system, may also simultaneously block the threat caused by the electronic communication. In some embodiments, the threat trigger signal is structured to allow the third-party provider system to block a threat caused by the electronic communication using DNS filtering or DNS blocking at the first networked device or other the networked devices (e.g., simultaneously via the instances of the browsers, operating systems, software, firewall systems/applications, servers, routers, provided on the networked devices). In some embodiments, the threat trigger signal is structured to allow instances of the firewall systems or application provided by the third-party provider system to block a threat caused by the electronic communication based on the IOC(s) information (e.g., simultaneously at the networked devices).

Hence, by structuring the threat trigger signal to allow a browser of the first networked device (i.e., recipient system) to block the threat caused by the electronic communication and transmitting the trigger signal to a third-party provider system providing the browser, the present invention is configured to allow blocking of the threat at the first networked device, even though the first networked device may not have threat prevention systems that are configured to utilize IOC(s) to provide security against the threat. Moreover, the single trigger signal, transmitted to the third-party provider system is structured to allow a plurality of networked devices (having instances of the browser, firewalls, operating systems and/or other software provided by the third-party system) to block the threat, concurrently and in real-time, without requiring separate signals to each device of the plurality of networked devices.

In some embodiments, in response to determining that an electronic communication is malicious or determining that the payload associated with the electronic communication is malicious and/or in response to receiving a request from the first networked device, the system is configured to identify a threat source system associated with the electronic communication. The threat source system may refer to a host system, a domain system, a domain service provider, a server, or another system associated with hosting or storing content associated with the malicious electronic communication (e.g., a malicious payload), associated with transmitting the malicious electronic communication, and/or the like. As indicated by block 580, the system is configured to transmit a threat elimination signal to the threat source system. The threat elimination signal may comprise a request or a control instruction to initiate the isolation or removal of the malicious electronic communication or payload, and/or prevent further transmission of the malicious electronic communication or payload.

The foregoing steps corresponding to the process flow 500 will be described in detail using an example of one specific embodiment of the invention, below. It is understood that the invention comprises multiple embodiments and is not limited to the illustrative example.

Figure 6:
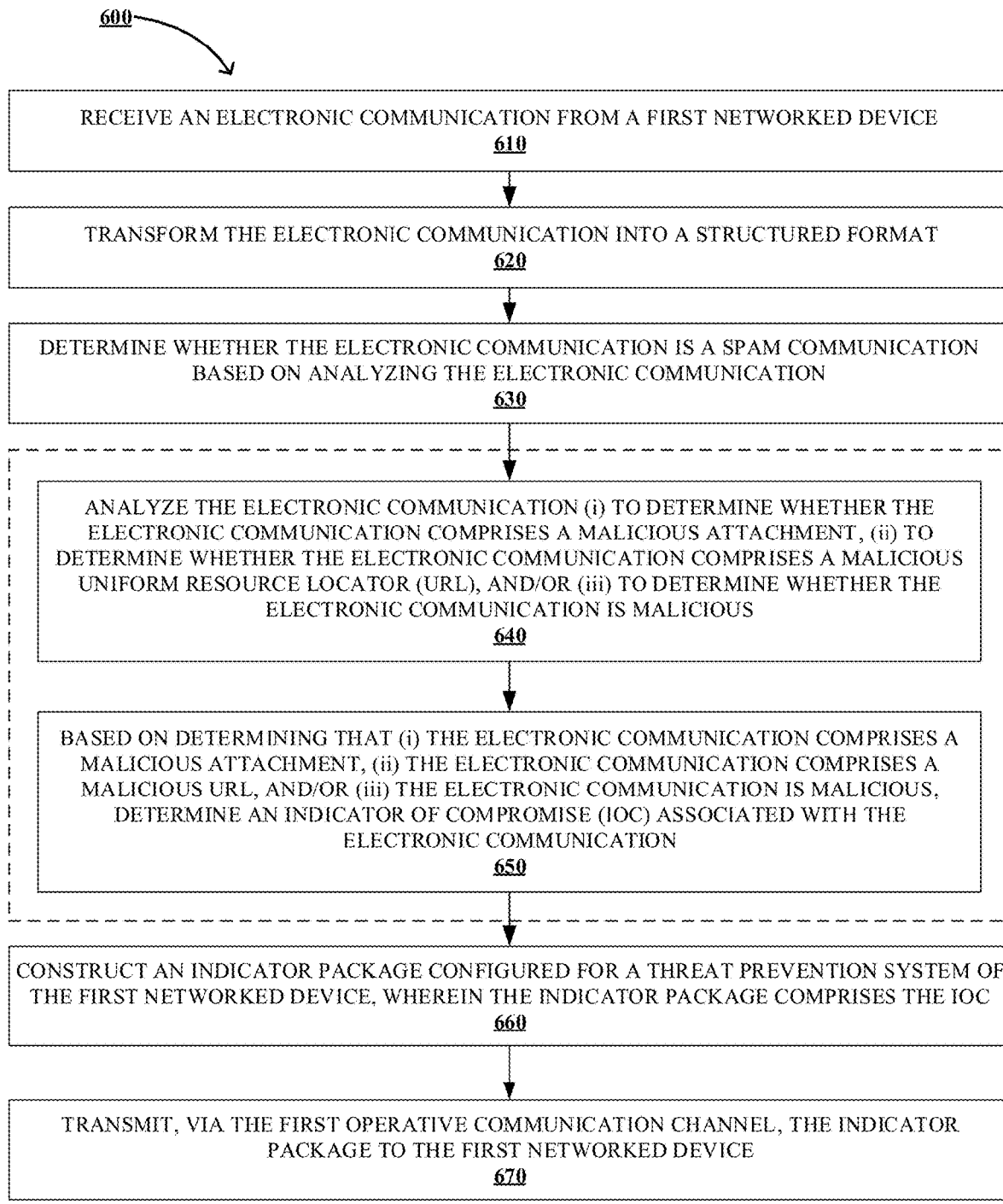
FIG. 6 illustrates a high level process flow 600 for detection and mitigation of malicious communications, in accordance with some embodiments of the invention.

FIG. 6 illustrates a high level process flow 600 for a security system for detection and mitigation of malicious electronic communications, in accordance with some embodiments of the invention. As discussed previously, the system receives an electronic communication (e.g., a questionable or flagged electronic communication) from a first networked device (i.e., a recipient system), as indicated by block 610. The electronic communication, along with other questionable or flagged electronic communications may be received at the system via first operative communication channel between the first networked device and the system. In some embodiments, the electronic communication comprises unstructured data. In some embodiments, the system retrieves the electronic communication from the networked device, while in other embodiments, the electronic communications are transmitted to the system by the networked device, or by individuals/users of the networked device. In some embodiments, the system is configured to provide a training interface on the first networked system and/or devices associated with the first networked system via a training platform of the system, to train users or operators of the first networked system and/or associated devices to better identify, flag and report malicious communications for analysis. In some embodiments, the system assigns a unique identifier to the electronic communication, so that the electronic communication can be tracked through the processing, transformation and analysis steps.

In the embodiments where the electronic communications are transmitted to the system by the networked device, the electronic communications may be transmitted using a server-side plug-in of the networked device, or the electronic communications may be forwarded to the system my users of the networked devices, in response to identifying a questionable electronic communication. As another example, the electronic communication may be transmitted by the networked device, automatically, using Application Program Interface (API) feeds or other automated identification and transmission methods.

In the embodiments where the electronic communications are retrieved by the system, the system may receive, via the first operative communication channel, a trigger signal indicating the electronic communication, from the first networked device. Subsequently, based on analyzing the trigger signal, the system may retrieve the electronic communication from the first networked device.

In some embodiments, the system performs a duplication check process to identify whether the electronic communication or a similar electronic communication was previously determined to be questionable or malicious. Here the system typically analyzes a prior electronic communication stored at a first storage location. Next, the system compares the electronic communication to the prior electronic communication stored at the first storage location. Typically, comparing comprises comparing the unstructured data of the electronic communication with prior unstructured data of the prior electronic communication. This process is repeated for other prior electronic communications stored at the first storage location. For example, the electronic communication is compared to a plurality of prior electronic communications stored at the first storage location.

The system logs the electronic communication at a log memory location based on determining that at a predetermined portion of the unstructured data of the electronic communication matches a corresponding predetermined portion of the prior unstructured data of the prior electronic communication. Alternatively, based on determining that at the predetermined portion of the unstructured data of the electronic communication does not match the corresponding predetermined portion of the prior unstructured data of the prior electronic communication, the system stores the electronic communication at the first storage location.

In some embodiments, the system compares all newly reported suspicious electronic communications with all electronic communications received from the first networked device (and/or other networked devices) stored at a first storage location, in the last seven (7) days based on "similarity", i.e., matching at least a portion of the electronic communications. If duplicates are determined, the electronic communication is logged for auditing purposes, but is not added again to first storage location. In some embodiments, all non-duplicate suspicious electronic communications are inventoried by "feed name" (Client name, date electronic communication received, etc.) in the first storage location.

In some embodiments, the system is configured to provide a training interface (e.g., a GUI) on the first networked system and/or devices associated with the first networked system via a training platform of the system, to train users or operators of the first networked system and/or associated devices to better identify and report malicious communications. Typically, the system constructs simulated electronic communications based on or modelled after electronic communications (e.g., those received at the first networked device and/or at other networked devices) that have been previously identified by the system as malicious (e.g., as described with respect to blocks 520-550 or blocks 620-650 below) and/or electronic communications that have been previously identified by the system to be benign, non-malicious or spam communications.

In some embodiments, the system is structured to identify at least one of one or more predetermined tactics, techniques and/or procedures (TTPs) associated with the electronic communication (e.g., the electronic communication that was determined to be malicious), as described with respect to block 560. As discussed, the system may automatically identify the TTPs by first identifying "Lures" contained on the electronic communication. The lures may comprise text and graphics included in the electronic communication, for example, in the body and/or header/subject field of the communication. The system may analyze these lures to identify the Tactics, Techniques, and Procedures (e.g., the system identifies either new TTPs or identifies TTPs at least partially based on previous analyses or previously identified TTPs) associated with the electronic communication. In some embodiments, the system may seek to identify predetermined types of one or more of Tactics, Techniques, and Procedures. In such embodiments, the system is structured to construct a simulation template for the electronic communication, based on the identified TTPs. In some embodiments, the simulation template is structured to mirror the tactics, techniques and/or procedures employed by the electronic communication (e.g., the electronic communication that was determined to be malicious) and/or by entities associated with transmitting the electronic communication, for example, to cause the recipient to perform actions similar to that caused by the electronic communication. As such, the simulated electronic communications based on identified TTPs and generated templates may be based on previously analyzed communications and/or electronic communications currently being analyzed. In some embodiments, the system constructs simulated electronic communications for the training of the users of the first networked device, based on electronic communications that are similar to those that are typically received at the first networked device or at other networked devices whose users or entities are similar to that of the first networked device (e.g., based on entity industry type, geography, volume of electronic communications received etc.). Moreover, the system may also incorporate the constructed simulation templates and/or the identified TTPs into a training platform for providing training to the user and construct user training communications associates with the training platform based on the identified TTPs and/or the constructed simulation templates. In some embodiments, the system may select a particular type of simulated electronic communication (e.g., an additional/second simulated electronic communication, or a first category of simulated electronic communication) or a particular type of training content (i.e., training communications) to be transmitted to the user based on the lure type, the type/category of identified TTPs, and the like.

The simulated electronic communications typically comprise a simulation signature. The system may mark or insert each of the simulated electronic communications with the simulation signature and/or the system may determine/generate the simulation signature based on contents, metadata and/or artifacts associated with the simulated electronic communications. The system typically stores the simulation signatures and the simulated electronic communications in a storage database. In some embodiments, the simulation signature refers to a "malicious simulation signature" associated with a simulated electronic communication modelled after a previously identified malicious electronic communication. In some embodiments, the simulation signature refers to a "benign simulation signature" associated with a simulated electronic communication modelled after a previously identified non-malicious electronic communication. In some instances, a simulated electronic communication modelled after a previously identified malicious electronic communication is referred to as a simulated malicious electronic communication, and a simulated electronic communication modelled after a previously identified non-malicious or benign electronic communication is referred to as a simulated non-malicious or benign electronic communication.

In some embodiments, the system typically transmits one or more of these simulated electronic communications to a user of the first networked system, (e.g. via electronic communication and personal information management software and/or web-based applications, Webmail, etc.). In some instances, the simulated electronic communication is transmitted to the user of the first networked system in a manner that the user typically receives electronic communications (e.g., using an email address associated with the user) and it may not be readily apparent to the user that transmitted communication is a simulated electronic communication for training and testing purposes. In some instances, the simulated electronic communication is transmitted to the user of the first networked system using training communications, via a training platform. In some embodiments, the system may select a particular type of simulated electronic communication (e.g., an additional/second simulated electronic communication, or a first category of simulated electronic communication), or a particular type of training content (i.e., training communications) to be transmitted to the user based on the lure type, the type/category of identified TTPs, and the like, as described above.

The user may then analyze the email and identify whether or not it is malicious. Based on presuming that a simulated electronic communication (e.g., a simulated electronic communication modelled after a previously identified malicious electronic communication) is malicious, the user may then forward or transmit the simulated electronic communication to the system for analysis. In response to receiving the electronic communication from the user (e.g., in a manner similar to that described with respect to blocks 510 or 610) the system is configured to compare the received electronic communication with the stored simulated electronic communications, to determine whether the received electronic communication is a simulated electronic communication created by the system for training purposes. Here, the system may analyze the electronic communication to identify whether or not the electronic communication comprises a simulation signature associated with a simulated electronic communication. The system may further identify whether the received simulated electronic communication was modelled based on a previously identified malicious communication or a benign communication.

In response to determining that the user correctly identified the simulated electronic communication (e.g., modelled after a previously identified malicious electronic communication) as malicious, the system typically transmits and/or displays a notification to the user indicating the successful identification. Similarly, in response to the user incorrectly identifying a simulated electronic communication (e.g., modelled after a previously identified benign electronic communication), the system typically transmits and/or displays a notification to the user indicating the correct identification and may also display portions of the simulated electronic communication that help identify and indicate whether or not it is malicious to help the user in future identifications. In some embodiments, the system is also configured to transmit a notification to a training administrator user/system regarding the successful/unsuccessful identification of malicious communications by the user. This notification may then trigger training administrator user/system to provide customized training to the user, or modify the training communications transmitted to the user, e.g., based on the successful/unsuccessful identification of malicious communications by the user.

In some embodiments, the system monitors the transmitted simulated electronic communications and actions performed by the user with respect to the simulated electronic communications. For example, the simulated email may be structured such that the system receives a notification in response to the user performing one or more actions associated with the simulated electronic communication (e.g., opening or reading the simulated electronic communication, opening/clicking on a particular portion of the simulated electronic communication such as an URL, an attachment etc., moving the simulated electronic communication to a particular folder, transmitting or reporting the simulated electronic communication to the system for analysis, and the like). Here, the system may monitor the transmitted simulated electronic communications and actions performed by the user with respect to the simulated electronic communications based on at least the user action notifications.

In some embodiments, the system may provide training to the user based on monitoring the transmitted simulated electronic communications and actions performed by the user. For example, the system may determine that the user incorrectly identified the simulated malicious electronic communication (e.g., modelled after a previously identified malicious electronic communication) as being benign or non-malicious, based on ascertaining that the user performed certain predetermined actions (e.g., opening the simulated malicious electronic communication or its attachments, taking no action on the simulated malicious electronic communication for during a predetermined time period after the communication was received by the user, and the like). In response to identifying that the user incorrectly identified the simulated malicious electronic communication, the system may then provide additional training to the user, for example, using the training interface or by transmitting additional training materials to help the user in future identifications.

In some embodiments, the system determined performance metrics based on monitoring the transmitted simulated electronic communications and actions performed by the user (i.e., interaction of the user with the simulated electronic communications). For example, the system may determine and compute performance metrics such as time taken for a user to perform a certain action (e.g., average time the user takes to report an electronic communication or a simulated electronic communication as malicious), percentages, rates, averages or total numbers associated with successful and/or unsuccessful identification and reporting of simulated electronic communications, performance parameters over a predetermined time period indicating improvement in correct identification and reporting, and the like. The system may transmit the performance metrics of the user and/or similar users to the first networking device and/or other systems associated with the entity or organization of the first networking device.

In other embodiments, the system may present one or more of these simulated electronic communications on a display device associated with the first networked system, via the training interface, and requests the user to identify whether the simulated electronic communication is malicious. In response to the user correctly identifying or flagging a simulated electronic communication modelled after a previously identified malicious electronic communication as malicious, or the user correctly identifying a simulated electronic communication modelled after a previously identified spam communication as non-malicious or benign, the system typically transmits and/or displays a notification to the user indicating the successful identification. Similarly, in response to the user incorrectly identifying a simulated electronic communication, the system typically transmits and/or displays a notification to the user indicating the correct identification and may also display portions of the simulated electronic communication that help identify and indicate whether or not it is malicious to help the user in future identifications.

In some embodiments, the system transmits training content (e.g., documents, audiovisual content, textual contents, training files and the like) to the user, and/or displays the training content in the training interface, at a predetermined time, at predetermined time intervals, in response to identifying new threats, at time intervals specified by the user, or at any other suitable time.

As discussed previously, typically, in response to receiving the electronic communication from the user (e.g., prior to further processing as described with respect to block 620 or prior to further processing described with respect to block 630) the system is configured to compare the electronic communication with the stored simulated electronic communications, to determine whether the received electronic communication is a simulated electronic communication created by the system for training purposes. Here, the system may analyze the electronic communication to identify whether or not the electronic communication comprises a simulation signature associated with a simulated electronic communication. In response to determining that the received electronic communication matches a simulated electronic communication (i.e., based on identifying a simulation signature), the system may cease further analysis of the electronic communication and present the training interface to the user. Alternatively, in response to determining that the received electronic communication is not a simulated electronic communication, the system may continue analysis of the electronic communication as described with respect to blocks 620-670 below.

Next, as illustrated by block 620, the system is configured to transform the electronic communication into a structured format. Typically, the transformation comprises converting the unstructured data of the electronic communication into structured format objects. Typically, the system converts the suspicious electronic communications into a structured format to facilitate scalable and fast data mining of the text of all artifacts contained in the electronic communication. For example, in some instances, the transformation to structured format or normalization process involves conversion of the unstructured data to a Java Script Object Notation (JSON) objects (for example, to facilitate for API data transfer and structured storage). The structured data may be stored at a second memory location.

In addition, the system is configured to parse the electronic communication. For example, in some instances, the system checks the first and/or second memory locations, periodically, to ensure all new suspicious electronic communications are processed and filtered (for example, to ensure that the electronic communications are not duplicated). Moreover, the system may also check and filter all attachments (and all electronic communications and attachments in attachments, and so on) contained in all suspicious electronic communications. In addition to other parsed electronic communication artifacts, in some instance, the system also determined whether the electronic communication contains URLs or not. If the suspicious electronic communication contains a URL, the system may determine it to be a "link-type scam". If the suspicious electronic communication does not contain any URLs or attachments, the system may determine the electronic communication to be a "Response Type Scam".

Here, in some instances, all parsed electronic communications are stored in a storage database. The storage database is a specific-purpose database that comprises a search engine to operate of the stored contents.

In some embodiments, the system comprises an electronic communication processing interface associated with an electronic communication management application. The electronic communication management application and/or the electronic communication processing interface may be provided by one or more of the sub-systems described previously. Here, the suspicious electronic communications are transmitted to the electronic communication management application, which may be a project management application such as a web-based application/software. In some embodiments, the system configures the electronic communication management application and/or the electronic communication processing interface, to customize the application for the suspicious electronic communication. For example, the system customizes the structure of each case with certain characteristics associated with the electronic communication. The electronic communication processing interface provides a real-time display of the status and processing details of the electronic communications from the receipt through the analysis process. The user may review, analyze and/or modify the processing of the electronic communications via the display. Here, the electronic communication management application may be used as a triaging/case management system, chosen for its extensible API control, allowing for automated case creation, updating, metric tracking, and manual review flow control.

The system is configured to determine whether the electronic communication is a spam communication based on analyzing the electronic communication, as indicated by block 630. The system typically determines whether the electronic communication corresponds to spam, based on identifying a predetermined pattern in the electronic communication using an automated pattern recognition feature of the system. This predetermined pattern is associated with a prior spam communication. The predetermined pattern may comprise, for example, at least a portion of a predetermined URL, a predetermined header field, a predetermined subject field, a predetermined message body field and/or a predetermined text content. Alternatively, or in addition to the automated patter recognition, the system may receive an indication of spam from a user. This user input maybe analyzed by the system for machine learning purposes, to identify future spam electronic communications automatically.

In some embodiments, for electronic communications that do not have attachments, the system may determine whether the electronic communications correspond to spam or unsolicited electronic communication. However, in some instances, for electronic communications that do have attachments, the system may skip the step of determining whether the electronic communication is a spam communication. In some embodiments, if the suspicious electronic communication is determined to be spam automatically by the system and/or based on receiving an analyst review input from a user, the system may mark the case as "Rejected" in electronic communication management application.

Marking the case as "Rejected" as used herein refers to categorizing or logging the electronic communication as benign after determining (either automatically or in response to a user review input) that the electronic communication is not malicious.

In some embodiments, the system performs the electronic communication processing steps 640 and 650 in response to determining that the electronic communication is not a spam communication. At block 640, the system is configured to analyze the electronic communication (i) to determine whether the electronic communication comprises a malicious attachment, (ii) to determine whether the electronic communication comprises a malicious Uniform Resource Locator (URL), and/or (iii) to determine whether the electronic communication is malicious.

In some embodiments, the if the suspicious electronic communication is determined not to be spam and does not contain any URLs, a user may conduct a manual review of the electronic communication to determine if the suspicious electronic communication is a Response Type Scam (e.g. 419 or BBC Scam). If the user determines that the electronic communication is benign, the system may mark the electronic communication as "Rejected". Alternatively, if the user determines that the electronic communication is malicious, the system may mark the case as "Closed" in the electronic communication management application and determine IOCs associated with the electronic communication, as will be described in detail below with respect to block 650.

In some embodiments, based on determining that the suspicious electronic communication is not spam and does contain at least one URL, the system may then determine if the URL(s) are qualified URLs or not. Here the URLs that are determined to be either URLs that are on a whitelist associated with the networked device, or the URLs that are determined using pattern technology to be benign or spam, are disqualified (for example, after cross checking with a URL databases). Alternatively, or in addition to the above, if the system (either automatically or in response to a user input) determines that at least one URL is qualified, the system then determines whether the URL is a duplicate (e.g., by reviewing the electronic communication management application for duplicates or using another URL database) to ascertain if the URL has already been classified as malicious or as a phishing threat. In some instance, if the system determines that all qualified URLs are duplicates, yet previously confirmed malicious or phishing threats, the system may automatically mark the case as "Closed" in electronic communication management application, and automatically retrieve IOCs associated with the electronic communication.

Typically, if the system determines the electronic communication is not spam and does contain at least one URL that is qualified (and/or not a duplicate), the system next determines whether the electronic communication contains any malicious URLs by automatically scanning URL databases, in some embodiments. Here, the system may review URLs that were already/historically crawled and determined to be malicious to identify if the current URL is malicious. If a prior malicious URL match is found, the system may then automatically mark the case as "Closed" in electronic communication management application, and automatically retrieve IOCs associated with the electronic communication. Alternatively or in addition to automatically confirming that the URL is malicious, the system may receive from a user, after a manual review of the URL, an indication whether the URL is a malicious link-type scam (i.e., a phishing scam where a lure electronic communication has a URL), or whether the URL is benign and can be "Rejected" (e.g., labeled as "Rejected") in the electronic communication management application. Typically, if the system and/or a user input determines that URL is malicious but does not link to a payload, the system may mark the case as "Closed" in the electronic communication management application and automatically retrieve IOCs associated with the electronic communication. As such, the system may determine (either automatically, or based on user input) whether or not the URL links to a payload (for example, a URL determined to be malicious in the previous example).

In some embodiments, based on determining that the electronic communication (i) does have attachments or (ii) does contain URLs which link to payloads, the system may cross-checked or compare the attachment or payload with a payload database of known payload threats. Alternatively, based on determining that the suspicious electronic communication does not have any malicious attachments or URLs to malicious payloads, the system may mark the case as "Rejected" in the electronic communication management application In some embodiments, for an electronic communication with an attachment and/or a URL link to the payload, the system may perform a sandbox analysis to determine if the attachments (PDFs, spreadsheets, etc.) or payloads are malicious. As part of the sandbox analysis process, the system may transmit the electronic communication to an isolated sandbox sub-system (e.g., 130d) or sandbox environment and perform an action of the electronic communication (e.g., open, execute, text, analyzed etc.) to determine if the attachment, the URL and/or the URL payload is malicious. Here, the system may execute or perform action upon suspicious payloads/attachments/URLs in the sandbox environment, including allowing the host machine to become infected, so that indicators of compromise may be automatically collected based on analyzing the negative effects of the payloads/attachments/URLs.

In some embodiments, the system may compare sandbox signatures of the suspicious electronic communication with a database of malicious sandbox signatures to automatically determine and classify malicious signatures within the electronic communication attachments or URL payloads. The sandbox signatures may comprise pattern matching signatures (e.g., YARA Signatures). The sandbox signatures may comprise descriptions of malware or malicious electronic communication families constructed based on textual or binary patterns. Each sandbox signature or rule, typically comprises of a set of strings and a Boolean expression which determine its logic. Based on the sandbox analysis, if the system determines that the suspicious electronic communication does have a malicious attachment and/or URL linking to a malicious payload, the system may then determine (automatically or based on user input) IOCs for the electronic communication.

Subsequently, as illustrated by block 650, the system determines an indicator of compromise (IOC) associated with the electronic communication based on determining that: (i) the electronic communication comprises a malicious attachment, (ii) the electronic communication comprises a malicious URL, and/or (iii) the electronic communication is malicious. "Determining" IOC(s) a used herein refers to at least one of the system extracting at least a portion of the IOC(s) from the electronic communication or the system receiving at least a portion of the IOC(s) from a user.

In some embodiments, the IOC(s) or the IOC artifacts are automatically extracted and added to the electronic communication management application by the system and/or added to an indicator package. These IOCs maybe specific to a particular networked device receiving the electronic communications/attachments/URLs.

In some embodiments, the system constructs an indicator package configured for a threat prevention system of the first networked device, as illustrated by block 660. The indicator package typically comprises the IOC(s) determined at block 650. In some embodiments, the system then transmits, via the first operative communication channel, the indicator package to the first networked device. In some embodiments, any new IOCs are uploaded into an Indicator Package formatted using a language and serialization format, such as a Structured Threat Information Expression Indicator Package format (e.g., formatted in accordance with STIX™ Version 2.0 specification, Version 2.1 specification and the like). The indicator package is then delivered to the networked device via an application layer protocol such as a Trusted Automated eXchange of Indicator Information format (e.g., formatted in accordance with TAXII™ Version 2.0 specification disclosed in "Working Draft 01" document dated Apr. 24, 2017).

As discussed previously, these determined IOCs are then transmitted to the first networked device (i.e., the recipient system of the electronic communication), and/or other networked devices (i.e., networked devices that are not the recipients of the electronic communication, or networked devices from which the electronic communication was not received by the system) in any suitable form (e.g., in the form of the indicator package containing the IOCs). As discussed, after IOCs have been identified during processing, they can be used for early detection of future attack attempts using threat prevention systems or threat defense systems (e.g., intrusion detection systems and antivirus software) of networked devices (e.g., the recipient system of the electronic communication and other networked systems that are not recipients of the electronic communication). In turn, the system typically transmits to the first networked device (e.g., via the first operative communication channel): (i) a first threat defense feed comprising IOCs determined by the system that are associated with electronic communications initially received at or that were directed to the first networked device, and/or (ii) a second threat defense feed comprising IOCs determined by the system that are associated with electronic communications received at other networked devices. In this way, the system allows for enhanced detection of threats at the first networked device based on the electronic communications received at the first networked device and also electronic communications received at other networked devices.

Additionally, as discussed previously, in some embodiments, the system is configured to transmit threat trigger signals associated with the determined malicious electronic communication to enable rapid browser/internet blocking of the threat/malicious electronic communication, in real-time, as indicated by block 670.

Specifically, the system may transmit a threat trigger signal to a third-party provider system which provides browsers, firewalls, operating systems and other software on one or more networked devices (e.g., the recipient system or the first networked device, a second networked device, and the like). Typically, the threat trigger signal is structured to allow instances of browsers, firewalls and/or other software of each of the plurality of networked devices, provided by the third-party provider system, to block a threat caused by the electronic communication and/or future malicious communications corresponding to the electronic communication, as discussed previously with respect to block 570. Typically, the threat trigger signal is structured to allow (i) a browser to block a threat caused by the electronic communication, wherein the browser is provided by the third-party provider system, (ii) a firewall application to block a threat caused by the electronic communication, wherein the firewall application is provided by the third-party provider system, and/or (iii) a software application to block a threat caused by the electronic communication, wherein the software application is provided by the third-party provider system.

In particular, the system typically transmits a threat trigger signal to a third-party provider system via the communication network. The threat trigger signal comprises the IOC(s) and/or associated data. In some embodiments, he threat trigger signal is structured to allow the browser provided by the third-party provider system on the first networked device or recipient system (and instances of the browser on other networked devices) to block a threat caused by the electronic communication based on the IOC(s), instantaneously or in real-time (e.g., using DNS filtering or blocking). In a similar manner, other instances of the browser provided on other networked devices by the third-party provider system, may also simultaneously block the threat caused by the electronic communication.

Hence, by structuring the threat trigger signal to allow a browser of the first networked device (i.e., recipient system) to block the threat caused by the electronic communication and transmitting the trigger signal to a third-party provider system providing the browser, the present invention is configured to allow blocking of the threat at the first networked device, even though the first networked device may not have threat prevention systems that are configured to utilize IOC(s) to provide security against the threat. Moreover, the single trigger signal, transmitted to the third-party provider system is structured to allow a plurality of networked devices (having instances of the browser, firewalls, operating systems and/or other software provided by the third-party system) to block the threat, concurrently and in real-time, without requiring separate signals to each device of the plurality of networked devices.

In some embodiments, the system may further determine whether or not to send the threat trigger signal based on crawling a URL database, for example, to determine if a trigger signal associated with the threat had previously been transmitted. Typically, once a new phishing threat or malicious electronic communication is determined by the system and/or confirmed by the user, the system may then log the new confirmed phishing threat into a URL database. Based on identifying IOC(s) associated with the malicious communications, the system may then crawl or parse this URL database and perform duplication checks, phish up or down internet accessibility checks, false positive checks, and the like, e.g., to determine whether or not to send the threat trigger signal. Once a newly confirmed malicious electronic communication is successfully crawled, the threat trigger signal associated with the malicious electronic communication may then be transmitted via a URL feed to networked devices, periodically (e.g., every 5-10 minutes) in some embodiments, and in-in real time with the identification of the IOC(s) in other embodiments.

As used herein, real-time or near real-time actions of the system, refer to actions that are performed synchronous with or substantially synchronous with the occurrence of the event (e.g., identification of IOCs). Specifically, in some instances, the system performs a real-time action instantaneously (e.g., within 1 or 2 seconds or less accounting for technology, system, device and network constraints) after determining/completing an event. In some instances, real-time or near real-time actions are performed substantially synchronous, or within a predetermined time after the occurrence of the event.

Figure 7:
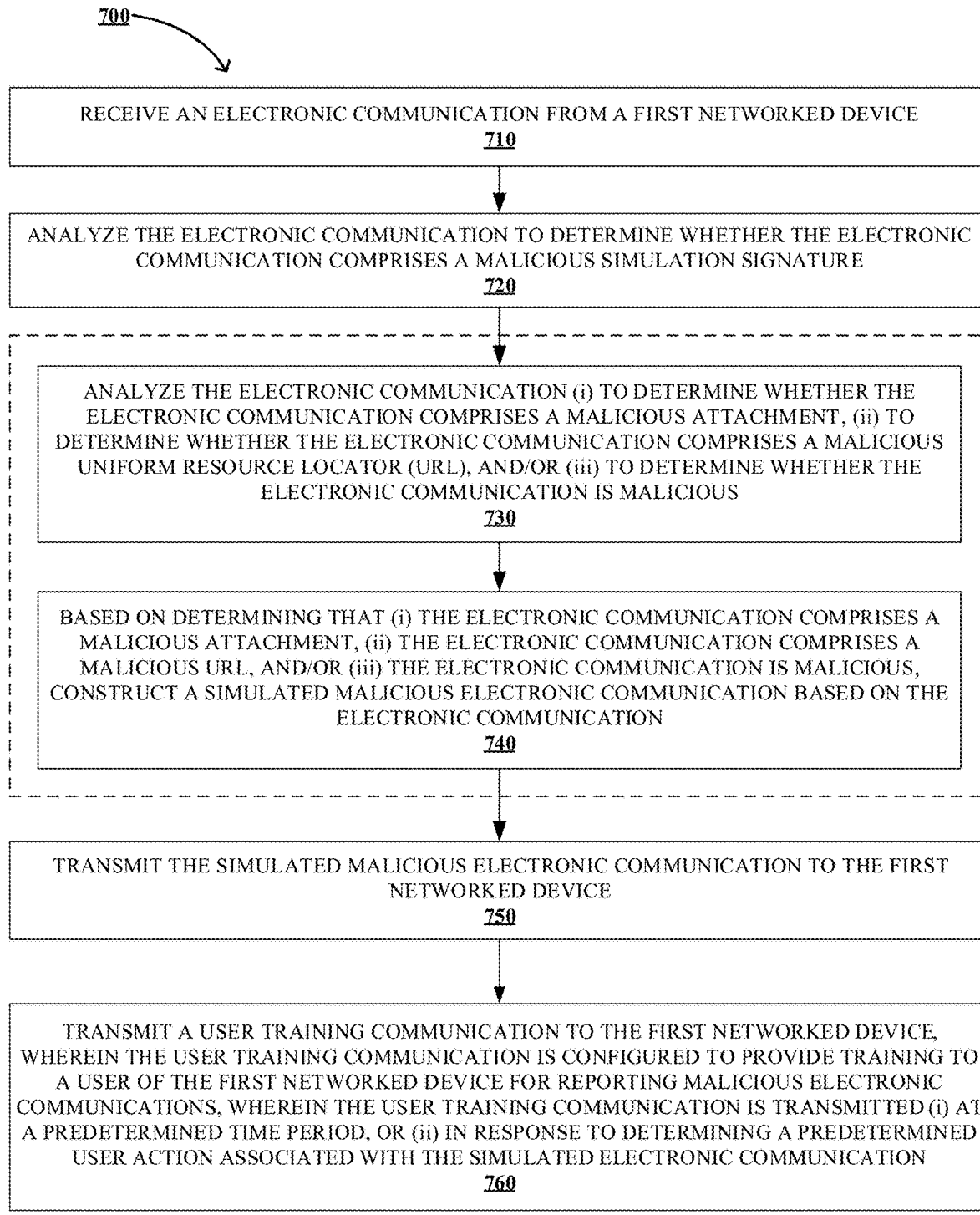
FIG. 7 illustrates a high level process flow 700 for detection and mitigation of malicious communications, in accordance with some embodiments of the invention.

FIG. 7 illustrates a high level process flow 700 for a security system for detection and mitigation of malicious electronic communications, in accordance with some embodiments of the invention. As alluded to previously, in some embodiments, the system is configured to provide a training interface on the first networked system and/or devices associated with the first networked system via a training platform of the system, to train users or operators of the first networked system and/or associated devices to better identify, flag and report malicious communications for analysis, typically, by simulating malicious communications. Typically, the system constructs simulated electronic communications based on or modelled after electronic communications (e.g., those received at the first networked device and/or at other networked devices) that have been previously identified by the system as malicious (e.g., as described previously with respect to blocks 520-550 or process flow 600 of FIG. 6) and/or electronic communications that have been previously identified by the system to be benign, non-malicious or spam communications. In some embodiments, the system constructs the simulated electronic communications based on identified TTPs and generated templates based on previously analyzed communications, as described previously with respect to block 560 and process flow 600 of FIG. 6. In some embodiments, the system constructs simulated electronic communications for the training of the users of the first networked device, based on electronic communications that are similar to those that are typically received at the first networked device or at other networked devices whose users or entities are similar to that of the first networked device (e.g., based on entity industry type, geography, volume of electronic communications received etc.). The simulated electronic communications typically comprise a simulation signature. The system may mark or insert each of the simulated electronic communications with the simulation signature and/or the system may determine/generate the simulation signature based on contents, metadata and/or artifacts associated with the simulated electronic communications. The system typically stores the simulation signatures and the simulated electronic communications in a storage database. In some embodiments, the simulation signature refers to a "malicious simulation signature" associated with a simulated electronic communication modelled after a previously identified malicious electronic communication.

The system typically receives an electronic communication (e.g., a questionable or flagged electronic communication) from a first networked device (i.e., a recipient system), as indicated by block 710. The electronic communication, along with other questionable or flagged electronic communications may be received at the system via an operative communication channel between the first networked device and the system, as discussed previously with respect to block 610 of FIG. 6. In some embodiments, the electronic communication, along with other questionable or flagged electronic communications may be received at the system via another operative communication channel between another networked device (e.g., a second networked device, a received electronic communion database, a threat database, a user system, etc.) and the system. In some embodiments, the electronic communication comprises unstructured data. In some embodiments, the system assigns a unique identifier to the electronic communication, so that the electronic communication can be tracked through the processing, transformation and analysis steps.

As discussed, the simulated electronic communications typically comprise a simulation signature. After receiving the electronic communication, the system may then analyze the electronic communication to determine whether the electronic communication comprises a malicious simulation signature, as illustrated by Block 720. Here, the system may parse the electronic communication to identify whether or not the electronic communication comprises a simulation signature associated with a simulated electronic communication. In response to determining that the received electronic communication matches a simulated electronic communication (i.e., based on identifying a simulation signature), the system may cease further analysis of the electronic communication and present the training interface to the user. Alternatively, in response to determining that the received electronic communication is not a simulated electronic communication, the system may continue analysis of the electronic communication as described with respect to blocks 730-760 below.

Next, in some embodiments, the system is configured to transform the electronic communication into a structured format. Typically, the transformation comprises converting the unstructured data of the electronic communication into structured format objects. Typically, the system converts the suspicious electronic communications into a structured format to facilitate scalable and fast data mining of the text of all artifacts contained in the electronic communication. For example, in some instances, the transformation to structured format or normalization process involves conversion of the unstructured data to a Java Script Object Notation (JSON) objects (for example, to facilitate for API data transfer and structured storage). The structured data may be stored at a second memory location. Also, the system is typically configured to determine whether the electronic communication is a spam communication based on analyzing the electronic communication, as described previously. In some embodiments, the system performs the electronic communication processing steps 730-760 below, in response to determining that the electronic communication is not a spam communication in addition to determining that the received electronic communication is not a simulated electronic communication.

At block 730, the system is configured to analyze the electronic communication (i) to determine whether the electronic communication comprises a malicious attachment, (ii) to determine whether the electronic communication comprises a malicious Uniform Resource Locator (URL), and/or (iii) to determine whether the electronic communication is malicious, in a manner similar to that described previously with respect to blocks 640-670. For instance, as discussed previously, the system may determine an indicator of compromise (IOC) associated with the electronic communication, construct an indicator package, transmit a threat trigger signal, and/or the like.

Next, at block 740, the system typically constructs a simulated malicious electronic communication based on the electronic communication, i.e., modelled after the electronic communication. The system typically constructs the simulated malicious electronic communication based on determining that (i) the electronic communication comprises a malicious attachment, (ii) the electronic communication comprises a malicious URL, and/or (iii) the electronic communication is malicious, as discussed previously. This simulated malicious electronic communication may be based on (i) electronic communications received and/or reported by the user, and/or (ii) electronic communications received by other users/entities or electronic communications or threat information stored in a database of the network.

In some embodiments, as discussed previously, the system may mark or insert each of the simulated electronic communications with the simulation signature and/or the system may determine/generate the simulation signature based on contents, metadata and/or artifacts associated with the simulated electronic communications. The system typically stores the simulation signatures and the simulated electronic communications in a storage database. In some embodiments, the simulation signature refers to a "malicious simulation signature" associated with a simulated electronic communication modelled after a previously identified malicious electronic communication. Although, as discussed, in alternative embodiments, the simulation signature refers to a "benign simulation signature" associated with a simulated electronic communication modelled after a previously identified non-malicious electronic communication (e.g., identified as non-malicious at block 730). In some instances, a simulated electronic communication modelled after a previously identified malicious electronic communication is referred to as a simulated malicious electronic communication, and a simulated electronic communication modelled after a previously identified non-malicious or benign electronic communication is referred to as a simulated non-malicious or benign electronic communication.

Next, as indicated by block 750, in some embodiments, the systems typically transmits one or more of these simulated electronic communications to a user of the first networked system, (e.g. via electronic communication and personal information management software and/or web-based applications, Webmail, etc.). In some instances, the simulated electronic communication is transmitted to the user of the first networked system in a manner that the user typically receives electronic communications (e.g., using an email address associated with the user) and it may not be readily apparent to the user that transmitted communication is a simulated electronic communication for training and testing purposes. The user may then analyze the email and identify whether or not it is malicious. Based on presuming that a simulated electronic communication (e.g., a simulated electronic communication modelled after a previously identified malicious electronic communication) is malicious, the user may then forward or transmit the simulated electronic communication to the system for analysis. In response to receiving the electronic communication from the user (e.g., in a manner similar to that described with respect to blocks 510 or 610) the system is configured to compare the received electronic communication with the stored simulated electronic communications, to determine whether the received electronic communication is a simulated electronic communication created by the system for training purposes. Here, the system may analyze the electronic communication to identify whether or not the electronic communication comprises a simulation signature associated with a simulated electronic communication. The system may further identify whether the received simulated electronic communication was modelled based on a previously identified malicious communication or a benign communication, as discussed previously.

Next at block 760, the system typically transmits a user training communication to the first networked device, wherein the user training communication is configured to provide training to a user of the first networked device for reporting malicious electronic communications. The user training communication is typically transmitted, in some embodiments, (i) at a predetermined time period (e.g., based on user preference, based on identifying that the user has received fewer email communications than a predetermined threshold in a certain time period, or based on a predetermined optimal time), or (ii) in response to determining a predetermined user action associated with the simulated electronic communication (e.g., based on the user analyzing a simulated electronic communication, either correctly or incorrectly, or based on the user requesting guidance or training).

In response to determining that the user correctly identified the simulated electronic communication (e.g., modelled after a previously identified malicious electronic communication) as malicious, the system typically transmits and/or displays a notification to the user indicating the successful identification. Similarly, in response to the user incorrectly identifying a simulated electronic communication (e.g., modelled after a previously identified benign electronic communication), the system typically transmits and/or displays a notification to the user indicating the correct identification and may also display portions of the simulated electronic communication that help identify and indicate whether or not it is malicious to help the user in future identifications.

In some embodiments, the system monitors the transmitted simulated electronic communications and actions performed by the user with respect to the simulated electronic communications. For example, the simulated email may be structured such that the system receives a notification in response to the user performing one or more actions associated with the simulated electronic communication (e.g., opening or reading the simulated electronic communication, opening/clicking on a particular portion of the simulated electronic communication such as an URL, an attachment etc., moving the simulated electronic communication to a particular folder, transmitting or reporting the simulated electronic communication to the system for analysis, and the like). Here, the system may monitor the transmitted simulated electronic communications and actions performed by the user with respect to the simulated electronic communications based on at least the user action notifications.

In some embodiments, the system may provide training to the user based on monitoring the transmitted simulated electronic communications and actions performed by the user. For example, the system may determine that the user incorrectly identified the simulated malicious electronic communication (e.g., modelled after a previously identified malicious electronic communication) as being benign or non-malicious, based on ascertaining that the user performed certain predetermined actions (e.g., opening the simulated malicious electronic communication or its attachments, taking no action on the simulated malicious electronic communication for during a predetermined time period after the communication was received by the user, and the like). In response to identifying that the user incorrectly identified the simulated malicious electronic communication, the system may then provide additional training to the user, for example, using the training interface or by transmitting additional training materials to help the user in future identifications.

In some embodiments, the system determined performance metrics based on monitoring the transmitted simulated electronic communications and actions performed by the user (i.e., interaction of the user with the simulated electronic communications). For example, the system may determine and compute performance metrics such as time taken for a user to perform a certain action (e.g., average time the user takes to report an electronic communication or a simulated electronic communication as malicious), percentages, rates, averages or total numbers associated with successful and/or unsuccessful identification and reporting of simulated electronic communications, performance parameters over a predetermined time period indicating improvement in correct identification and reporting, and the like. The system may transmit the performance metrics of the user and/or similar users to the first networking device and/or other systems associated with the entity or organization of the first networking device.

In other embodiments, the systems may present one or more of these simulated electronic communications on a display device associated with the first networked system, via the training interface, and requests the user to identify whether the simulated electronic communication is malicious. In response to the user correctly identifying or flagging a simulated electronic communication modelled after a previously identified malicious electronic communication as malicious, or the user correctly identifying a simulated electronic communication modelled after a previously identified spam communication as non-malicious or benign, the system typically transmits and/or displays a notification to the user indicating the successful identification. Similarly, in response to the user incorrectly identifying a simulated electronic communication, the system typically transmits and/or displays a notification to the user indicating the correct identification and may also display portions of the simulated electronic communication that help identify and indicate whether or not it is malicious to help the user in future identifications.

In some embodiments, the system transmits training content (e.g., documents, audiovisual content, textual contents, training files and the like) to the user, and/or displays the training content in the training interface, at a predetermined time, at predetermined time intervals, in response to identifying new threats, at time intervals specified by the user, or at any other suitable time. This training content may be based on (i) electronic communications received and/or reported by the user, and/or (ii) electronic communications received by other users/entities or electronic communications or threat information stored in a database of the network.

As used herein, real-time or near real-time actions of the system, refer to actions that are performed synchronous with or substantially synchronously with the occurrence of the event (e.g., identification of IOCs). Specifically, in some instances, the system performs a real-time action instantaneously (e.g., within 1 or 2 seconds or less accounting for technology, system, device and network constraints) after determining/completing an event. In some instances, real-time or near real-time actions are performed substantially synchronous, or within a predetermined time after the occurrence of the event.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Some embodiments of the present invention are described herein above with reference to flowchart illustrations and/or block diagrams of apparatuses and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

As used herein, a processor/computer, which may include one or more processors/computers, may be "configured to" perform a stated function in a variety of ways, including, for example, by having one or more general-purpose circuits perform the stated function by executing one or more computer-executable program code portions embodied in a computer-readable medium, and/or by having one or more application-specific circuits perform the stated function.

While the foregoing disclosure discusses illustrative embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any embodiment may be utilized with all or a portion of any other embodiment, unless stated otherwise.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A computerized system for detecting and mitigating malicious communications, wherein the computerized system is configured to deliver indicators of compromise in response to identifying and isolating malicious communication, the computerized system comprising:
a memory device with computer-readable program code stored thereon;
a communication device, wherein the communication device is configured to establish operative communication with a plurality of networked devices via a communication network;
one or more processing devices operatively coupled to the memory device and the communication device, wherein the one or more processing devices are configured to execute the computer-readable program code to:
receive, via a first operative communication channel, an electronic communication from a first networked device of the plurality of networked devices;
analyze the electronic communication (i) to determine whether the electronic communication comprises a malicious attachment, (ii) to determine whether the electronic communication comprises a malicious Uniform Resource Locator (URL), and/or (iii) to determine whether the electronic communication is malicious;
based on determining that (i) the electronic communication comprises a malicious attachment, (ii) the electronic communication comprises a malicious URL, and/or (iii) the electronic communication is malicious, determine an indicator of compromise (IOC) associated with the electronic communication;
construct an indicator package configured for a threat prevention system of the first networked device, wherein the indicator package comprises the IOC;
transmit, via the first operative communication channel, the indicator package to the first networked device;
transmit a second indicator package to the first networked device, wherein the second indicator package comprises one or more IOCs extracted from one or more electronic communications received from one or more entities not associated with the first networked device;
analyze a prior electronic communication stored at a first storage location;
compare the electronic communication to the prior electronic communication stored at the first storage location, wherein comparing comprises comparing unstructured data of the electronic communication with prior unstructured data of the prior electronic communication;
based on determining that at a predetermined portion of the unstructured data of the electronic communication matches a corresponding predetermined portion of the prior unstructured data of the prior electronic communication, log the electronic communication at a log memory location; and
based on determining that at the predetermined portion of the unstructured data of the electronic communication does not match the corresponding predetermined portion of the prior unstructured data of the prior electronic communication, store the electronic communication at the first storage location.

2. The computerized system of claim 1, wherein the one or more processing devices are configured to execute the computer-readable program code to:

transmit a threat trigger signal to a third-party provider system of a third party provider via the communication network, wherein the threat trigger signal comprises the IOC;
wherein the threat trigger signal is structured to allow (i) a browser to block a threat caused by the electronic communication, wherein the browser is provided by the third-party provider system, (ii) a firewall application to block a threat caused by the electronic communication, wherein the firewall application is provided by the third-party provider system, or (iii) a software application to block a threat caused by the electronic communication, wherein the software application is provided by the third-party provider system.

3. The computerized system of claim 1, wherein the one or more processing devices are configured to execute the computer-readable program code to:
transmit a threat elimination signal to a threat source system associated with the electronic communication, wherein the threat elimination signal is configured to notify the threat source system to remove a threat associated with the electronic communication.

4. The computerized system of claim 3, wherein transmitting the threat elimination signal to the threat source system associated with the electronic communication further comprises:
receiving, via the first operative communication channel, an indication to remove the threat caused by the electronic communication from a user of the first networked device; and
identifying the threat source system associated with the electronic communication.

5. The computerized system of claim 1, wherein the one or more processing devices are configured to execute the computer-readable program code to transform the electronic communication into a structured format, wherein the transformation comprises converting the unstructured data of the electronic communication into structured format objects.

6. The computerized system of claim 5, wherein transforming the electronic communication into the structured format further comprises converting the unstructured data into Java Script Object Notation objects.

7. The computerized system of claim 1, wherein the one or more processing devices are configured to execute the computer-readable program code to assign a unique identifier to the electronic communication.

8. The computerized system of claim 1, wherein determining whether the electronic communication is a spam communication further comprises:
identifying a predetermined pattern in the electronic communication based on analyzing the electronic communication, wherein the predetermined pattern is associated with a prior spam communication;
wherein the predetermined pattern comprises at least a portion of: a predetermined URL, a predetermined header field, a predetermined subject field, a predetermined message body field and/or, a predetermined text content.

9. The computerized system of claim 1, wherein the indicator package is configured to enhance the threat prevention system of the first networked device in real-time, wherein the indicator package is constructed in a Structured Threat Information Expression format.

10. The computerized system of claim 1, wherein the indicator package is transmitted to the first networked device via Trusted Automated eXchange of Indicator Information format.

11. The computerized system of claim 1, wherein the one or more processing devices are configured to execute the computer-readable program code to:
   identify that the electronic communication comprises an attachment based on analyzing the electronic communication; and
   based on (i) identifying, at a memory location, a prior malicious attachment matching the attachment and/or (ii) receiving a user input indicating that the attachment is malicious determine that the attachment is malicious.

12. The computerized system of claim 1, wherein the one or more processing devices are configured to execute the computer-readable program code to:
   identify that the electronic communication comprises an attachment based on analyzing the electronic communication;
   transmit the attachment to a sandbox system; and
   determine that the attachment is malicious based on operating the attachment at the sandbox system.

13. The computerized system of claim 1, wherein the one or more processing devices are configured to execute the computer-readable program code to:
   identify that the electronic communication comprises a URL based on analyzing the electronic communication; and
   based on (i) identifying, at a memory location, a prior malicious URL matching the URL and/or (ii) receiving a user input indicating that the URL is malicious, determine that the URL is malicious.

14. The computerized system of claim 1, wherein the one or more processing devices are configured to execute the computer-readable program code to:
   identify that the electronic communication comprises a URL based on analyzing the electronic communication; and
   determine that the URL is malicious based on at least identifying that:
      the URL does not match a whitelist associated with the first networked device; and
      the URL is not associated with a spam URL.

15. The computerized system of claim 1, wherein the one or more processing devices are configured to execute the computer-readable program code to:
   identify that the electronic communication comprises a URL based on analyzing the electronic communication;
   determine whether the URL links to a payload;
   in response to determining that the URL links to the payload, transmit the URL to a sandbox system; and
   determine that the URL is malicious based on operating the payload at the sandbox system.

16. The computerized system of claim 1, wherein the one or more processing devices are configured to execute the computer-readable program code to:
   analyze the electronic communication to determine whether the electronic communication comprises a malicious simulation signature; and
   analyze the electronic communication (i) to determine whether the electronic communication comprises the malicious attachment, (ii) to determine whether the electronic communication comprises the malicious Uniform Resource Locator (URL), and/or (iii) to determine whether the electronic communication is malicious, in response to determining that the electronic communication does not comprise the malicious simulation signature.

17. The computerized system of claim 1, wherein the one or more processing devices are configured to execute the computer-readable program code to:
   construct a simulated malicious electronic communication based on the electronic communication;
   transmit the simulated malicious electronic communication to the first networked device; and
   transmit a user training communication to the first networked device, wherein the user training communication is configured to provide training to a user of the first networked device for reporting malicious electronic communications, wherein the user training communication is transmitted (i) at a predetermined time period, or (ii) in response to determining a predetermined user action associated with the simulated electronic communication.

18. The computerized system of claim 17, wherein the one or more processing devices are configured to execute the computer-readable program code to:
   receive, via the first operative communication channel, the simulated electronic communication from the user of the first networked device;
   analyze the simulated electronic communication to determine whether the user correctly identified the simulated electronic communication as malicious; and
   in response to determining that the user correctly identified the simulated electronic communication as malicious, transmit a notification to the first networked device indicating successful identification of the simulated electronic communication by the user.

19. The computerized system of claim 1, wherein receiving the electronic communication further comprises:
   receiving, via the first operative communication channel, a trigger signal associated with the electronic communication from the first networked device of the plurality of networked devices; and
   based on analyzing the trigger signal, retrieving the electronic communication from the first networked device.

20. A method for detecting and mitigating malicious communications, wherein the method is configured to deliver indicators of compromise in response to identifying and isolating malicious communication, the method comprising:
   receiving, via a first operative communication channel, an electronic communication from a first networked device of a plurality of networked devices;
   analyzing the electronic communication (i) to determine whether the electronic communication comprises a malicious attachment, (ii) to determine whether the electronic communication comprises a malicious Uniform Resource Locator (URL), and/or (iii) to determine whether the electronic communication is malicious;
   based on determining that (i) the electronic communication comprises a malicious attachment, (ii) the electronic communication comprises a malicious URL, and/or (iii) the electronic communication is malicious, determining an indicator of compromise (IOC) associated with the electronic communication;
   constructing an indicator package configured for a threat prevention system of the first networked device, wherein the indicator package comprises the IOC;
   transmitting, via the first operative communication channel, the indicator package to the first networked device; and
   transmitting a second indicator package to the first networked device, wherein the second indicator package comprises one or more IOCs extracted from one or more electronic communications received from one or more entities not associated with the first networked device;

analyzing a prior electronic communication stored at a first storage location;

comparing the electronic communication to the prior electronic communication stored at the first storage location, wherein comparing comprises comparing unstructured data of the electronic communication with prior unstructured data of the prior electronic communication;

based on determining that at a predetermined portion of the unstructured data of the electronic communication matches a corresponding predetermined portion of the prior unstructured data of the prior electronic communication, logging the electronic communication at a log memory location; and based on determining that at the predetermined portion of the unstructured data of the electronic communication does not match the corresponding predetermined portion of the prior unstructured data of the prior electronic communication, storing the electronic communication at the first storage location.

21. The method of claim 20, wherein the method further comprises:

transmitting a threat trigger signal to a third-party provider system of a third party provider via the communication network, wherein the threat trigger signal comprises the IOC;

wherein the threat trigger signal is structured to allow (i) a browser to block a threat caused by the electronic communication, wherein the browser is provided by the third-party provider system, (ii) a firewall application to block a threat caused by the electronic communication, wherein the firewall application is provided by the third-party provider system, or (iii) a software application to block a threat caused by the electronic communication, wherein the software application is provided by the third-party provider system.

22. The method of claim 20, wherein the method further comprises:

transmitting a threat elimination signal to a threat source system associated with the electronic communication, wherein the threat elimination signal is configured to notify the threat source system to remove a threat associated with the electronic communication.

23. A computerized system for detecting and mitigating malicious communications, wherein the computerized system is configured to simulate malicious communications, the computerized system comprising:

a memory device with computer-readable program code stored thereon;

a communication device, wherein the communication device is configured to establish operative communication with a plurality of networked devices via a communication network;

one or more processing devices operatively coupled to the memory device and the communication device, wherein the one or more processing devices are configured to execute the computer-readable program code to:

receive, via a first operative communication channel, an electronic communication from one of the plurality of networked devices;

analyze the electronic communication to determine whether the electronic communication comprises a malicious simulation signature;

in response to determining that the electronic communication does not comprise the malicious simulation signature, analyze the electronic communication (i) to determine whether the electronic communication comprises a malicious attachment, (ii) to determine whether the electronic communication comprises a malicious Uniform Resource Locator (URL), and/or (iii) to determine whether the electronic communication is malicious;

based on determining that (i) the electronic communication comprises a malicious attachment, (ii) the electronic communication comprises a malicious URL, and/or (iii) the electronic communication is malicious, construct a simulated malicious electronic communication based on the electronic communication;

transmit the simulated malicious electronic communication to a first networked device of plurality of networked devices;

transmit a user training communication to the first networked device, wherein the user training communication is configured to provide training to a user of the first networked device for reporting malicious electronic communications, wherein the user training communication is transmitted (i) at a predetermined time period, or (ii) in response to determining a predetermined user action associated with the simulated electronic communication;

receive, via a second operative communication channel, the simulated electronic communication from the user of the first networked device;

analyze the simulated electronic communication to determine whether the user correctly identified the simulated electronic communication as malicious; and in response to determining that the user correctly identified the simulated electronic communication as malicious, transmit a notification to the first networked device indicating the successful identification of the simulated electronic communication by the user.

24. The computerized system of claim 23, wherein the one or more processing devices are configured to execute the computer-readable program code to:

identify at least one of one or more predetermined tactics, techniques and/or procedures associated with the electronic communication; and based on the identified at least one of the one or more tactics, techniques and/or procedures, construct a simulation template;

wherein the simulated malicious electronic communication is constructed based on the simulation template.

25. The computerized system of claim 24, wherein the electronic communication is received from the first networked device of the plurality of networked devices, wherein the user training communication is constructed based on the simulation template.

26. The computerized system of claim 23, wherein the one or more processing devices are configured to execute the computer-readable program code to:

based on determining that (i) the electronic communication comprises a malicious attachment, (ii) the electronic communication comprises a malicious URL, and/or (iii) the electronic communication is malicious, determine an indicator of compromise (IOC) associated with the electronic communication;

construct an indicator package configured for a threat prevention system of the first networked device, wherein the indicator package comprises the IOC; and transmit, via the second operative communication channel, the indicator package to the first networked device.

27. The computerized system of claim 26, wherein the one or more processing devices are configured to execute the computer-readable program code to:

transmit a threat trigger signal to a third-party provider system of a third party provider via the communication network, wherein the threat trigger signal comprises the IOC;

wherein the threat trigger signal is structured to allow (i) a browser to block a threat caused by the electronic communication, wherein the browser is provided by the third-party provider system, (ii) a firewall application to block a threat caused by the electronic communication, wherein the firewall application is provided by the third-party provider system, or (iii) a software application to block a threat caused by the electronic communication, wherein the software application is provided by the third-party provider system.

28. The computerized system of claim 26, wherein the one or more processing devices are configured to execute the computer-readable program code to:

transmit a threat elimination signal to a threat source system associated with the electronic communication, wherein the threat elimination signal is configured to notify the threat source system to remove a threat associated with the electronic communication.

29. A computerized system for detecting and mitigating malicious communications, wherein the computerized system is configured to deliver indicators of compromise in response to identifying and isolating malicious communication, the computerized system comprising:

a memory device with computer-readable program code stored thereon;

a communication device, wherein the communication device is configured to establish operative communication with a plurality of networked devices via a communication network;

one or more processing devices operatively coupled to the memory device and the communication device, wherein the one or more processing devices are configured to execute the computer-readable program code to:

receive, via a first operative communication channel, an electronic communication from a first networked device of the plurality of networked devices;

analyze the electronic communication (i) to determine whether the electronic communication comprises a malicious attachment, (ii) to determine whether the electronic communication comprises a malicious Uniform Resource Locator (URL), and/or (iii) to determine whether the electronic communication is malicious;

based on determining that (i) the electronic communication comprises a malicious attachment, (ii) the electronic communication comprises a malicious URL, and/or (iii) the electronic communication is malicious, determine an indicator of compromise (IOC) associated with the electronic communication;

construct an indicator package configured for a threat prevention system of the first networked device, wherein the indicator package comprises the IOC;

transmit, via the first operative communication channel, the indicator package to the first networked device;

transmit a second indicator package to the first networked device, wherein the second indicator package comprises one or more IOCs extracted from one or more electronic communications received from one or more entities not associated with the first networked device;

construct a simulated malicious electronic communication based on the electronic communication;

transmit the simulated malicious electronic communication to the first networked device;

transmit a user training communication to the first networked device, wherein the user training communication is configured to provide training to a user of the first networked device for reporting malicious electronic communications, wherein the user training communication is transmitted (i) at a predetermined time period, or (ii) in response to determining a predetermined user action associated with the simulated electronic communication;

receive, via the first operative communication channel, the simulated electronic communication from the user of the first networked device;

analyze the simulated electronic communication to determine whether the user correctly identified the simulated electronic communication as malicious; and in response to determining that the user correctly identified the simulated electronic communication as malicious, transmit a notification to the first networked device indicating successful identification of the simulated electronic communication by the user.

30. A computerized system for detecting and mitigating malicious communications, wherein the computerized system is configured to simulate malicious communications, the computerized system comprising:

a memory device with computer-readable program code stored thereon;

a communication device, wherein the communication device is configured to establish operative communication with a plurality of networked devices via a communication network;

one or more processing devices operatively coupled to the memory device and the communication device, wherein the one or more processing devices are configured to execute the computer-readable program code to:

receive, via a first operative communication channel, an electronic communication from one of the plurality of networked devices;

analyze the electronic communication to determine whether the electronic communication comprises a malicious simulation signature;

in response to determining that the electronic communication does not comprise the malicious simulation signature, analyze the electronic communication (i) to determine whether the electronic communication comprises a malicious attachment, (ii) to determine whether the electronic communication comprises a malicious Uniform Resource Locator (URL), and/or (iii) to determine whether the electronic communication is malicious;

based on determining that (i) the electronic communication comprises a malicious attachment, (ii) the electronic communication comprises a malicious URL, and/or (iii) the electronic communication is malicious, construct a simulated malicious electronic communication based on the electronic communication;

transmit the simulated malicious electronic communication to a first networked device of plurality of networked devices;

transmit a user training communication to the first networked device, wherein the user training communication is configured to provide training to a user of the first networked device for reporting malicious electronic communications, wherein the user training communication is transmitted (i) at a predetermined time period, or (ii) in response to determining a predetermined user action associated with the simulated electronic communication;

identify at least one of one or more predetermined tactics, techniques and/or procedures associated with the electronic communication; and based on the identified at least one of the one or more tactics, techniques and/or procedures, construct a simulation template;

wherein the simulated malicious electronic communication is constructed based on the simulation template.

31. The computerized system of claim 30, wherein the electronic communication is received from the first networked device of the plurality of networked devices, wherein the user training communication is constructed based on the simulation template.

* * * * *